United States Patent
Chaubey et al.

(10) Patent No.: US 8,639,273 B2
(45) Date of Patent: Jan. 28, 2014

(54) PARTITIONED PROXY SERVER FOR FACILITATING POWER CONSERVATION IN WIRELESS CLIENT TERMINALS

(75) Inventors: Nishith Chaubey, San Diego, CA (US); Krishnan Rajamani, San Diego, CA (US); Samir Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 899 days.

(21) Appl. No.: 12/366,883

(22) Filed: Feb. 6, 2009

(65) Prior Publication Data

US 2010/0203905 A1 Aug. 12, 2010

(51) Int. Cl.
*H04W 68/00* (2009.01)
*H04B 15/00* (2006.01)

(52) U.S. Cl.
USPC .......................................... 455/458; 455/503

(58) Field of Classification Search
USPC ........ 455/519, 503, 404.2, 343.2, 458, 456.1, 455/435.1, 452.1, 414.1, 11.1; 370/311, 370/328, 310, 337, 401; 709/203, 224; 715/741, 738, 739
See application file for complete search history.

(56) References Cited

U.S. PATENT DOCUMENTS

| | | | |
|---|---|---|---|
| 5,978,366 A | 11/1999 | Massingill et al. | |
| 6,519,447 B1 | 2/2003 | Chang et al. | |
| 6,968,153 B1 | 11/2005 | Heinonen et al. | |
| 7,269,629 B2 | 9/2007 | Zmudzinski et al. | |
| 7,349,355 B2 * | 3/2008 | Sengupta et al. | 370/311 |
| 7,629,963 B1 | 12/2009 | Wright | |
| 2003/0198196 A1 | 10/2003 | Bahl et al. | |
| 2004/0063451 A1 * | 4/2004 | Bonta et al. | 455/519 |
| 2004/0203377 A1 | 10/2004 | Eaton et al. | |
| 2005/0079817 A1 | 4/2005 | Kotola et al. | |

(Continued)

FOREIGN PATENT DOCUMENTS

| CN | 200966070 Y | 10/2007 |
|---|---|---|
| CN | 101114861 B | 12/2010 |

(Continued)

OTHER PUBLICATIONS

International Search Report and Written Opinion—PCT/US10/023416, International Search Authority—European Patent Office, May 17, 2010.

(Continued)

*Primary Examiner* — Kiet Doan
(74) *Attorney, Agent, or Firm* — Jeffrey D. Jacobs

(57) ABSTRACT

A power conservation method and system are provided for conserving power in client terminals by using a partitioned proxy server. The client terminal, having low-power and high-power communication interfaces, may power down its high-power communication interface to conserve power. Prior to shutting off its high-power communication interface, the client terminal may assign a partitioned proxy server to act as its proxy. The partitioned proxy server may include remote and local paging proxies which communicate with each other over an IP network. The remote paging proxy receives paging requests from an access point or the communication network and forwards it to the local paging proxy. The local paging proxy then forwards the paging message to the client terminal via a low-power communication interface. Upon receipt of the paging message via its low-power communication interface, the client terminal may power up its high-power communication interface and directly respond to the paging message.

45 Claims, 15 Drawing Sheets

(56) References Cited

U.S. PATENT DOCUMENTS

| | | |
|---|---|---|
| 2005/0136834 A1 | 6/2005 | Bonta et al. |
| 2006/0087993 A1 | 4/2006 | Sengupta et al. |
| 2006/0092888 A1 | 5/2006 | Jeong et al. |
| 2006/0140196 A1 | 6/2006 | Tanaka et al. |
| 2006/0218396 A1 | 9/2006 | Laitinen et al. |
| 2006/0293079 A1 | 12/2006 | Bahl et al. |
| 2007/0004436 A1* | 1/2007 | Stirbu ............ 455/503 |
| 2007/0015523 A1 | 1/2007 | Prakash et al. |
| 2007/0105496 A1 | 5/2007 | Bonta et al. |
| 2007/0189256 A1 | 8/2007 | Oh |
| 2007/0204160 A1 | 8/2007 | Chan et al. |
| 2007/0234041 A1 | 10/2007 | Lakshmeshwar et al. |
| 2007/0242647 A1 | 10/2007 | Bennett |
| 2008/0016230 A1 | 1/2008 | Holtmanns et al. |
| 2008/0189440 A1 | 8/2008 | Goyal et al. |
| 2008/0259912 A1 | 10/2008 | Wang et al. |
| 2008/0261529 A1 | 10/2008 | Rosenblatt |
| 2009/0017844 A1 | 1/2009 | Li et al. |
| 2009/0209232 A1 | 8/2009 | Cha et al. |
| 2009/0219844 A1 | 9/2009 | Soliman |
| 2009/0221261 A1 | 9/2009 | Soliman |
| 2009/0221303 A1 | 9/2009 | Soliman et al. |
| 2009/0325622 A1 | 12/2009 | Matsumura et al. |
| 2010/0271978 A1 | 10/2010 | Gupta et al. |
| 2011/0131414 A1 | 6/2011 | Cheng et al. |
| 2011/0134832 A1 | 6/2011 | Soliman |
| 2011/0255444 A1 | 10/2011 | Soliman et al. |
| 2011/0255692 A1 | 10/2011 | Soliman et al. |
| 2011/0256891 A1 | 10/2011 | Soliman et al. |
| 2011/0264913 A1 | 10/2011 | Nikander et al. |

FOREIGN PATENT DOCUMENTS

| | | |
|---|---|---|
| GB | 2396525 B | 5/2006 |
| JP | 2000102069 A | 4/2000 |
| JP | 2003521135 A | 7/2003 |
| JP | 2007096988 | 4/2007 |
| JP | 2007140590 A | 6/2007 |
| TW | I291638 B | 12/2007 |
| WO | 0042807 A1 | 7/2000 |
| WO | 2007056467 A1 | 5/2007 |
| WO | WO2009009385 | 1/2009 |
| WO | WO2009130796 A1 | 10/2009 |

OTHER PUBLICATIONS

Taiwan Search Report—TW099103700—TIPO—Jan. 23, 2013.

* cited by examiner

PARTITIONED PROXY SERVER FOR FACILITATING POWER CONSERVATION IN WIRELESS CLIENT TERMINALS

BACKGROUND

1. Field

Various features pertain to wireless communication systems. At least one feature pertains to a system and method for facilitating the power conservation in client terminals by using a scalable partitioned proxy server to receive and forward paging messages to a client terminal via a secondary communication interface when the client terminal shuts off its primary communication interface.

2. Background

Client terminals, such as laptop computers, personal digital assistant devices, mobile or cellular phones, or any other device with a processor, that communicate with other devices through wireless signals are becoming increasingly popular. Client terminals are typically battery-powered and the amount of power a battery can provide is limited. With consumers using powerful applications that run on the client terminals, particularly entertainment media and imaging applications, conserving battery power is important.

Client terminals may operate in one of several modes, including an "active" mode and an "idle" mode. In active mode, client terminals may actively exchange data with one or more access points (e.g., base stations, Node B, femto cell, etc.) in a wireless communication system, e.g., voice or data calls or sessions. In idle mode, the client terminal may monitor control channels, such as the paging channel (PCH) for paging messages. Such paging messages may include messages that alert the client terminal to the occurrence of an incoming call and control/overhead messages that carry system information and other information for the client terminal. In the idle mode, conventional client terminals may consume a significant amount of power to sustain circuitry needed to monitor a paging channel. That is, the client terminal may periodically turn its receiver On to listen for paging messages over its paging channel. Such cycling of the receiver results in significant power consumption. For example, in a communication device that is compliant with Code Division Multiple Access (CDMA) (including Wideband Code Division Multiple Access (W-CDMA)) and/or Global System for Mobile Communications (GSM) standards, current consumption in idle mode may be as high as few milli-amperes (mA) as a result of cycling the receiver On and Off.

As a result of this current consumption, the available battery power of the client terminal decreases, shortening the standby time between battery recharges and the talk time when a call is placed or received.

Therefore, there is a need for a solution that reduces power consumption of a client terminal while it is in idle mode.

SUMMARY

One feature provides a system and method for facilitating power conservation in a client terminal by using a partitioned proxy server to monitor for and forward paging messages (via a secondary communication interface or low power interface) intended for the client terminal while the client terminal shuts Off its primary communication interface or high power interface. The partitioned proxy server may include a remote paging proxy and a local paging proxy. The remote paging proxy may monitor and/or receive a paging message on behalf of the client terminal and forwards it to the local paging proxy (e.g., over an internet packet (IP) network). The local paging proxy may receive the forwarded paging message to the client terminal via the secondary communication interface. When the client terminal receives the forwarded paging message, it turns On its primary interface and replies to the paging message via an access point to the communication network.

By separating the proxy server into two elements, the remote paging proxy and the local paging proxy, multiple service providers and/or multiple technologies may be utilized. Additionally, by separating out the remote paging proxy, if the client terminal moves to an area out of the service area of the selected local paging proxy, the network may store or hold the paging message until the client terminal has selected a new local paging proxy and then forward the paging message to the client terminal via the new local paging proxy. As there is a geographic separation between the remote paging proxy and the local paging proxy, the remote paging proxy may maintain contact with the access point while the client terminal may be in a region which the selected local paging proxy does not have service.

The client terminal may find local paging proxies by scanning on its low power interface. The lower power interface is used to scan is used to scan for available local paging proxies since it is the interface that will be used to receive paging messages when the client terminal's high power interface is turned Off. When one or more local paging proxies are identified by the client terminal, it may select one local paging proxy to serve as its "proxy" based on which available local paging proxy has the best or strongest short range link as measured or perceived at the client terminal's low power interface. The client terminal may then send a proxy request to the selected local paging proxy to establish a communication link via the low power interfaces of both the client terminal and the local paging proxy. The selected local paging proxy may then add the client terminal to its local proxy list so that it may then forward the proxy request to the remote paging proxy. The remote paging proxy may then add the client terminal to its remote proxy list.

Once the proxy request is sent and/or accepted by the local paging proxy and/or remote paging proxy, the high power interface of the client terminal may be powered down (e.g., turned Off) to facilitate power conservation. Since the low power interface consumes less power than the high power interface, the client terminal conserves power and the life of the internal power source of the client terminal may be extended.

The corresponding remote paging proxy of the selected local paging proxy may monitor access points for paging messages intended for the client terminal. Upon receiving a paging message intended for the client terminal in its list, the paging message is sent by the access point to the remote paging proxy which then forwards the paging message to the local paging proxy via an IP Network. The local paging proxy may then forward the paging message (or portion thereof) to the client terminal over its low power interface. The paging message may include sufficient information so that the intended client terminal can send a paging response or reply to the paging message (e.g., accept the call), such as a broadcast control channel number (BCCH), a BCCH time offset, a sector number, etc.

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

Figure 1:
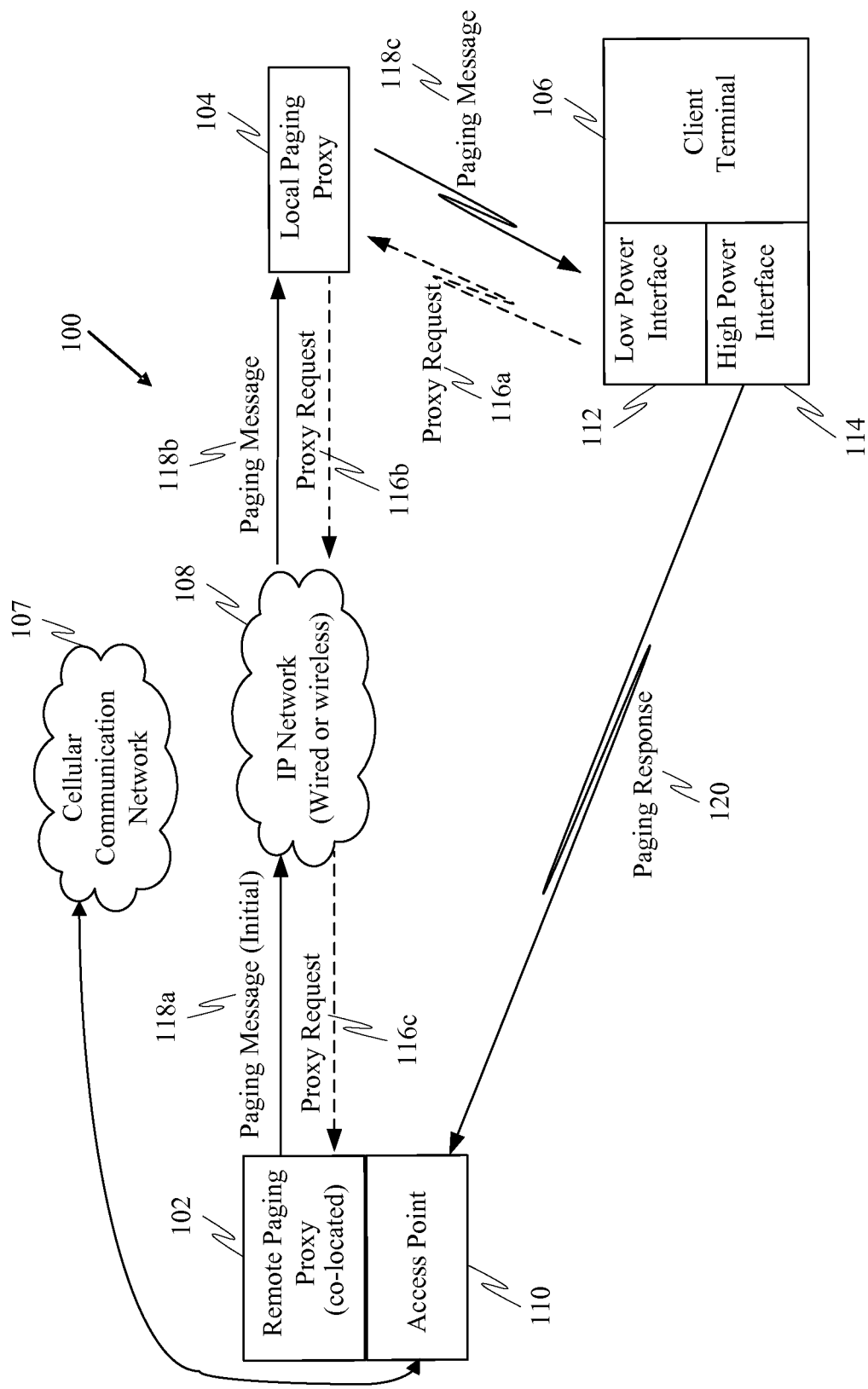
FIG. 1 is a block diagram illustrating a wireless communication system in which a partitioned paging proxy server facilitates power conservation in client terminals.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

In the following description, certain terminology is used to describe certain features. For instance, the term "access point" refers to a device that facilitates wireless connectivity (for wireless communication devices) to a communication or data network. For example, an "access point" may include base stations, Node-B devices, femto cells, pico cells, etc. The terms "client terminal" refer to mobile phones, pagers, wireless modems, personal digital assistants, personal information managers (PIMs), palmtop computers, laptop computers, and/or other mobile communication/computing devices which communicate, at least partially, through a wireless or cellular network.

Overview

One feature provides a system and method for facilitating power conservation in a client terminal by using a partitioned proxy server to monitor for and forward paging messages (via a secondary communication interface or low power interface) intended for the client terminal while the client terminal shuts Off its primary communication interface or high power interface. The partitioned proxy server may include a remote paging proxy and a local paging proxy. The remote paging proxy may monitor and/or receive a paging message on behalf of the client terminal and forwards it to the local paging proxy (e.g., over an internet packet (IP) network). The local paging proxy may receive the forwarded paging message to the client terminal via the secondary communication interface. When the client terminal receives the forwarded paging message, it turns On its primary interface and replies to the paging message via an access point to the communication network.

In various examples, the remote paging proxy may be co-located with or adjacent to the access point (base station) for the communication network, or it may be located separately within the communication network.

By separating the proxy server into two elements, the remote paging proxy and the local paging proxy, multiple service providers and/or multiple technologies may be utilized. For instance, the remote paging proxy may provide flexibility by including plug-in modules that support new technologies, such as new cellular technologies. Additionally, by separating out the remote paging proxy, if the client terminal moves to an area out of the service area of the selected local paging proxy, the network may store or hold the paging message until the client terminal has selected a new local paging proxy and then forward the paging message to the client terminal via the new local paging proxy. In other words, as there is a geographic separation between the remote paging proxy and the local paging proxy, the remote paging proxy may maintain contact with the access point while the client terminal may be in a region which the selected local paging proxy does not have service. In one example, the proxy request from the client terminal may be triggered when the client terminal roams to a region that does not have service.

Wireless Communication Network with Partitioned Paging Proxies

FIG. 1 is a block diagram illustrating a wireless communication system 100 in which one or more partitioned proxy servers may act as proxies to facilitate power conservation in client terminals. The partitioned proxy server may include a remote paging proxy 102 and a local paging proxy 104. In this configuration, the remote paging proxy 102 may be co-located with an access point 110 (e.g., base stations, Node Bs, femto cells, pico cells, etc) for a cellular communication network 107. The remote paging proxy 102 may be coupled to an Internet Protocol (IP) or packet network 108 (either wired or wireless) through which it can communicate with one or more local paging proxies 104. Note that, in some implementations, the cellular communication network 107 may operate through, or is the same as, the IP network 108.

A client terminal 106 may be configured to communicate with the access point 110 (and the cellular communication network 107) via a high power interface (e.g., primary communication interface). The local paging proxy 104 and client terminal 106 may also include low power interfaces 112 (or transceivers) for communicating directly with each other.

When a prior art client terminal operates in idle mode, it may continue to consume power from its internal power source as the high power interface is cycled On and Off to check for paging messages or change in configuration. As a result, available power continues to decrease, causing the standby time between battery recharges and the available talk time when a call is placed or received to be shortened.

By contrast, the client terminal 106 may be configured for improved power conservation. In a power conservation mode of operation, the client terminal 106 may request that the local paging proxy 104 act as its proxy. The client terminal 106 may find local paging proxies by scanning on its low power interface 112. In some implementations, the low power interface 112 is used to scan for local paging proxies since it is the interface that will be used to receive paging messages when the client terminal's high power interface 114 is turned Off. In performing such scan, the client terminal 106 may attempt to identify potential local paging proxies that have both a low power interface as well as an interface to the IP network 108. This is so that the local paging proxy 104 is able to receive paging messages via the IP network 108 from the remote paging proxy 102 and forward them to the intended client terminal 106 via the low power interface 112.

When one or more local paging proxies are identified by the client terminal 106, it may select one local paging proxy 104 to serve as its "proxy" based on which available local paging proxy 104 has the best or strongest short range link as measured or perceived at the client terminal's low power interface 112. The client terminal may send a proxy request 116 to the selected local paging proxy 104 along with, possibly, a client identifier. In some implementations, the client terminal 106 may pre-establish a secure relationship with one or more local paging proxies 104. By pre-establishing a secure relationship, the client terminal 106 may trust the selected local paging proxy 104 acting as its proxy to forward incoming paging messages 118 it receives from the remote paging proxy 102.

Once a local paging proxy 104 has been identified and selected, a communication link via the low power interfaces of both the client terminal 106 and the local paging proxy 104 may be established or setup. Once the selected local paging proxy 104 has been established as a proxy for the client terminal 106, the local paging proxy 104 adds the client terminal 106 to its local proxy list. Once added to the local proxy list, the local paging proxy 104 may then forward the proxy request 116 to the remote paging proxy 102. The remote paging proxy 102 may then add the client terminal 106 to its remote proxy list. Once the proxy request 116 is sent and/or accepted by the local paging proxy 104 and/or remote paging proxy 102, the high power interface 114 of the client terminal 106 may be powered down (e.g., turned Off) to facilitate power conservation. Since the low power interface 112 consumes less power than the high power interface 114, the client terminal 106 conserves power and the life of the internal power source of the client terminal 106 may be extended.

The corresponding remote paging proxy 102 of the selected local paging proxy 104 may monitor the access point 110 for paging messages intended for the client terminal 106. Upon receiving a paging message intended for the client terminal 106 in its list, the paging message 118 is sent by the access point 110 to the remote paging proxy 102 which forwards the paging message 118 to the local paging proxy 104 via the IP Network 108. The local paging proxy 104 may then forward the paging message 118 (or portion thereof) to the client terminal 106 over its low power interface. The paging message 118c may include sufficient information so that the intended client terminal 106 can send a paging response or reply 120 to the paging message (e.g., accept the call), such as a broadcast control channel number (BCCH), a BCCH time offset, a sector number, etc. For example, a paging message for a CDMA2000-compliant network may also include some or all of the following fields.

| Field | Length (bits) | Description |
| --- | --- | --- |
| CONFIG_MSG_SEQ | 6 | Configuration message sequence number |
| ACC_MSG_SEQ | 6 | Access parameters message sequence number. |
| CLASS_0_DONE | 1 | Class 0 pages done indicator. |
| CLASS_1_DONE | 1 | Class 1 pages done indicator. |
| TMSI_DONE | 1 | TMSI pages done indicator. |
| ORDERED_TMSIS | 1 | TMSIs sent in numerical order. |
| BROADCAST_DONE | 1 | Broadcast pages done indicator. |
| RESERVED | 4 | Reserved bits. |
| ADD_LENGTH | 3 | Number of octets in the page message specific fields. |
| ADD_PFIELD | 8 × add length | Additional page message specific fields. |

The remote paging proxy 102 and the local paging proxy 104 may similarly act as a "proxy" for a plurality of other client terminals by monitoring for paging messages intended for such other client terminals and forwarding the paging messages that may be received.

According to one feature, the proxy scheme between the client terminal 106 and the partitioned proxy server (remote paging proxy 102 and local paging proxy 104) may be transparent to the rest of the system 100 such that access points do not have to modify their operations. For example, the remote paging proxy 102 may monitor the paging messages of the access points (e.g., over the air transmissions or directly obtained from the access point 110) and is therefore seamless to the rest of the communication system 100 (including possibly access point 110).

In one implementation, the low power interface 112 (e.g., a secondary communication interface, low bandwidth communication interface, or short range communication interface) may consume less power than the high power interface (e.g., a primary communication interface, high bandwidth communication interface, or long range communication interface). It should be clear that the terms "high power" and "low power" are relative terms and do not imply a particular level of power consumption. The low power interface of the client terminal 106 simply consumes less power than the high power interface 114 of the client terminal for a given time of operation. Typically, lower bandwidth and/or shorter range interfaces will consume less power than higher bandwidth and/or longer range interfaces. The client terminal 106 may be powered by an internal (limited) power source (e.g., battery).

One example of a long range, high power, and/or high bandwidth communication interface is a W-CDMA compliant transceiver. However, in other examples, such high power interface may operate according contemporary communication standards, including but not limited to W-CDMA, cdma2000, GSM, WiMax, and WLAN. In W-CDMA, the client terminal 106 may use Discontinuous Reception (DRX) in idle mode of its high power interface in order to reduce power consumption. When DRX is used, the client terminal monitors one Page Indicator, PI, in one Paging Occasion per DRX cycle. The Paging Indicator Channel (PICH) may be a fixed rate (SF=256) physical channel used to carry the paging indicators. The PICH is associated with an Secondary Common Control Physical Channel (S-CCPCH) to which a PCH transport channel is mapped.

One example of a short range, low power, and/or low bandwidth communication interface is a Bluetooth compliant transceiver that uses a time-division duplex (TDD) scheme. Such Bluetooth interface may alternately transmit and receive in a synchronous manner. This allows a plurality of terminals connected via Bluetooth technology to communicate in an ad hoc fashion often called piconet. The piconet may be synchronized by a system clock of a master terminal, i.e. a terminal that initiates communications with a slave terminal. The Bluetooth Device Address (BD_ADDR) of the master terminal determines the frequency hopping sequence and the channel access code; the system clock of the master terminal determines the phase in the hopping sequence. The master terminal also controls the traffic on the channel by a polling scheme. The master terminal never adjusts its system clock during the existence of the piconet. The slave terminals may adapt their native clocks with a timing offset in order to match the master clock. The Bluetooth clocks may have a resolution of 312.5 microseconds, for example.

The Bluetooth baseband protocol is a combination of circuit and packet switching. Slots may be reserved for synchronous packets. Each packet is transmitted in a different hop frequency. A packet nominally covers a single slot, but can be extended to cover up to five slots, for example. The Bluetooth transmission channel may be divided into 625μ second slots. Transmission occurs in packets that occupy an odd number of slots (1, 3, or 5). In one example, each packet is transmitted on a different hop frequency with a maximum frequency hopping rate of 1600 hops/second in case packets occupy a single slot, and a minimum hopping rate of 320 hops/second in case packets occupy 5 slots. Note that every slot has a frequency associated with it, however transmission of a packet occupying multiple slots may use the frequency associated with the first slot. A slave packet transmission (from a slave terminal) may follow a master packet transmission (from a master terminal). A slave terminal may respond to a master terminal's packet that is specifically addressed to it. In case it does not have any data to send, the slave terminal may send a NULL packet. Moreover, each packet may contain acknowledgement ACK information for the previous packet received.

Normally, a connection between two terminals occurs in the following fashion. A master terminal (e.g., client terminal 106) uses the General Inquiry Access Code (GIAC) and Dedicated Inquiry Access Code (DIAC) to inquire about the Bluetooth devices (e.g., local paging proxy 104) in its range (Inquire substate). If any nearby Bluetooth device (terminal) is listening for these inquiries (Inquiry scan sub-state), it responds to the master terminal by sending its address and frequency Hop Synchronization (FHS) packet to the master (Inquiry response sub-state). After sending the information, the slave may start listening for page messages from the master terminal (Page scan). The master terminal, after discovering the in-range Bluetooth devices (terminals), may page these slave terminals (Page sub-state) for connection setup. The slave terminal, in page scan mode if paged by this master terminal, responds (Slave response sub-state) with its Device Access Code (DAC). The master terminal, after receiving the response from the slave terminal, may respond by transmitting the master terminal's real time clock, master terminal's BD_ADDR, the BCH parity bits and the class of the master terminal (FHS packet). After slave terminal has received this FHS packet, both enter into Connection state and may start communicating.

During page scan state, a Bluetooth compliant terminal may wait for page requests 116 or paging messages 118 from other Bluetooth compliant terminals. This page scan state may include alternating scan- and sleep-phases. Two parameters may define the page scan state: the page scan interval Tpage_scan specifies the time between two consecutive scan phases and the page scan window Tpage_scan_window determines the duration of a scan phase. In some implementations of -Bluetooth compliant terminals, the page scan interval can vary from 11.25 milli-seconds to 2.56 seconds.

The signaling detection techniques described herein may be used for various wireless communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Worldwide Interoperability for Microwave Access (Wi-Max). A CDMA system may implement a radio access technology (RAT) such as Wideband CDMA (W-CDMA), cdma2000, and so on. RAT refers to the technology used for over-the-air communication. A TDMA system may implement a RAT such as Global System for Mobile Communications (GSM). Universal Mobile Telecommunication System (UMTS) is a system that uses W-CDMA and GSM as RATs and is described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available.

As used herein, an access point 110 may be a device that may communicate with client terminals and may also be referred to as, and include some or all the functionality of, a base station, a Node B, or some other similar devices. A client terminal 106 may also be referred to as, and include some or all the functionality of, a user equipment (UE), a wireless communication device, a mobile station, computer, laptop, mobile phone, cellular phone, or some other terminology. In some implementations, the operations and/or functionality of a remote paging proxy 102 may be integrated in an access point 110.

Figure 2A:
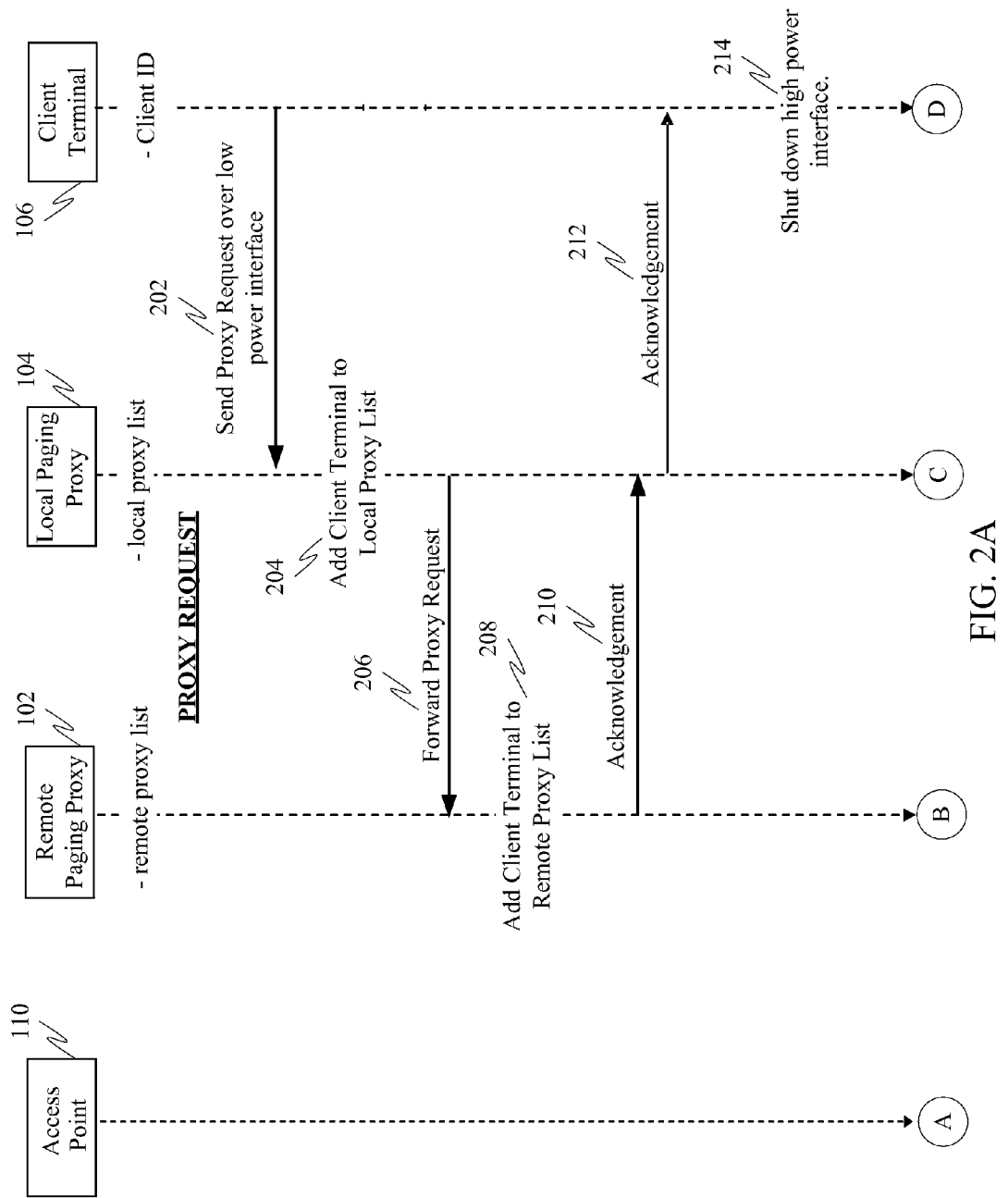
FIG. 2 is a flow diagram illustrating the operation of a wireless communication system in which a partitioned proxy server facilitates power conservation in client terminals.
Figure 2B:
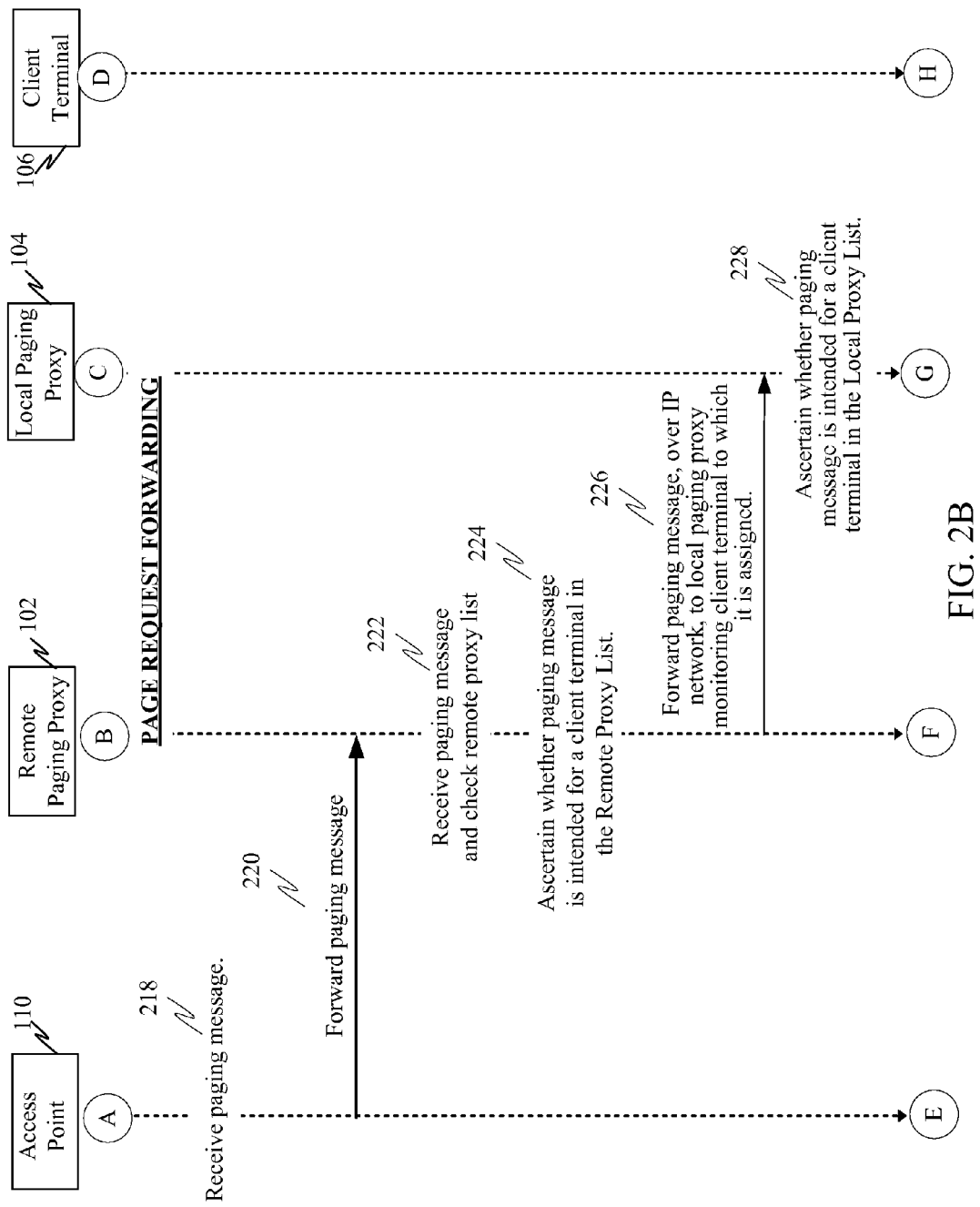
Figure 2C:
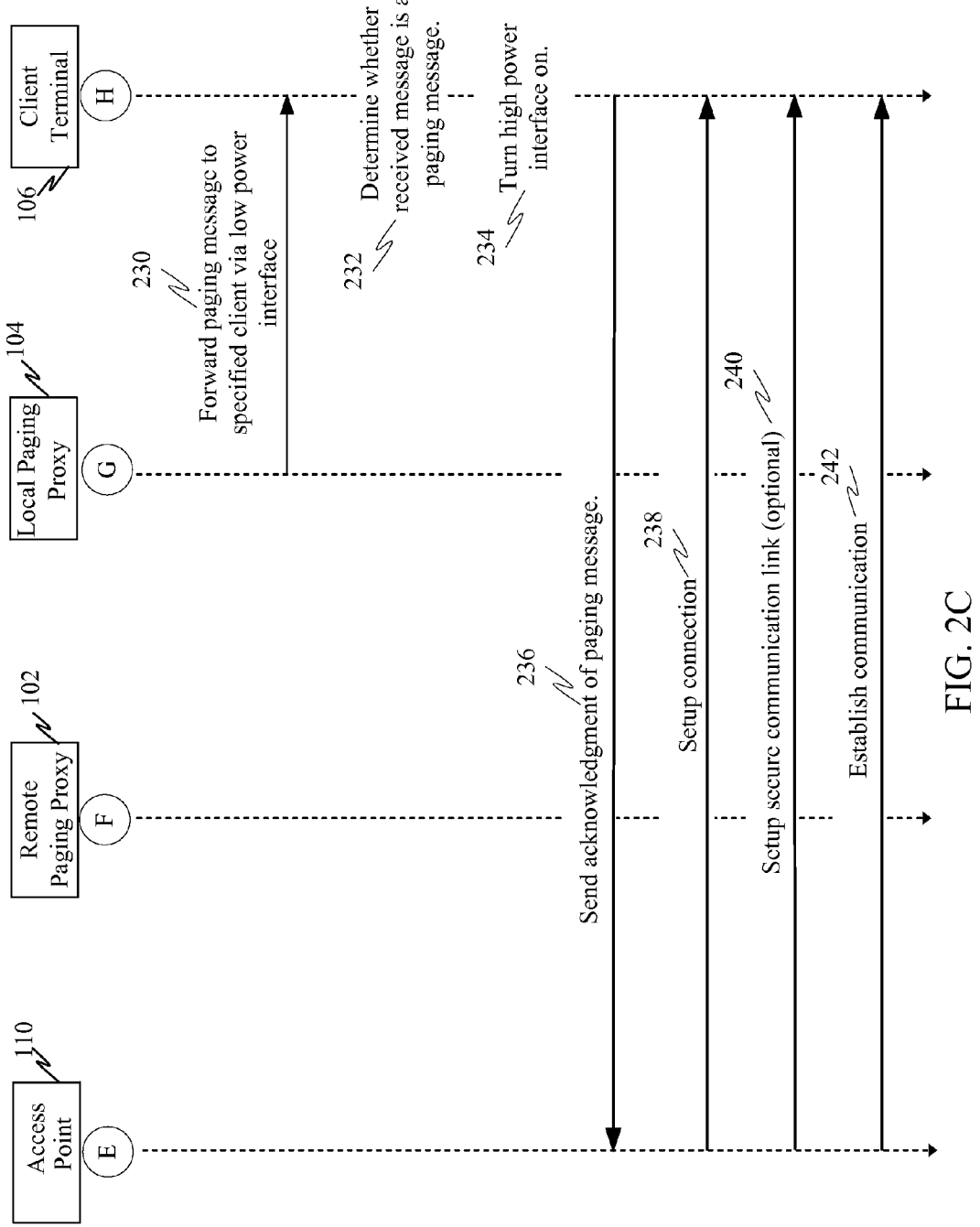

FIG. 2 is a flow diagram illustrating the operation of a wireless communication system in which a partitioned proxy server facilitates power conservation in client terminals. The partitioned proxy server may include a remote paging proxy and a local paging proxy. In this example, access point 110, remote paging proxy 102, local paging proxy 104, and client terminal 106 of FIG. 1 are used for illustration purposes. The client terminal 106 may store a Client Identifier (ID), traffic and/or paging channel information, sector information, and/or a hop sequence (e.g., for its high power interface) associated with the client terminal 106. The remote paging proxy 102 and local paging proxy 104 may maintain a remote client proxy list and a local client proxy list, respectively, of the client terminals for which they are acting as a proxy. The remote proxy list may include client terminals names or identifiers as well as the local paging proxy that is responsible for each client terminal.

When the client terminal 106 wishes to conserve power or roams into a new service area, it may indicate to the local paging proxy 104 of a partitioned proxy server to operate as its proxy by sending a proxy request 202 (which may include its client ID, a traffic or paging channel, sector, hopping sequence, etc., sufficient to allow for monitoring of paging messages for the client terminal), for example, over its low power interface (e.g. a secondary interface). Using, for example, the client ID, the local paging proxy 104 may then add the client terminal 106 to its local proxy list 204. The local paging proxy 104 may then forward the client terminal's proxy request 206 to the remote paging proxy 102 over an IP Network. Using, for example, the client ID forwarded in the proxy request 206, the remote paging proxy 102 may then add the client terminal 106 to its remote proxy list 208 and may then send an acknowledgement 210 to the local paging proxy 104 to acknowledge receipt of the information. Upon receipt of the acknowledgement from the remote paging proxy, the local paging proxy may also send an acknowledgement 212 to the client terminal 106 to acknowledge receipt of the information (and potentially also to acknowledge that it is acting as the proxy for the client terminal). After receiving the acknowledgement 212, the client terminal 106 may shut down (or power down) its high power interface 214.

The access point 110 may receive a paging message (or a portion thereof) intended for the client terminal 218. After receiving the paging message, the access point 110 may forward the paging message intended for the client terminal 106 to the remote paging proxy 220. With the paging message, the remote paging proxy may also receive sufficient information to reply to the paging message. The remote paging proxy 102 may receive the forwarded paging message, over its network communication interface, and check its proxy list 222. Using, for example, the Client ID, the remote paging proxy 102 ascertains whether the paging message is intended for a client terminal on the remote proxy list 224. If the paging message is intended for a client terminal on the remote proxy list, the remote paging proxy 102 (or co-located access point 110) may forward the paging message, e.g., over the IP Network, to the local paging proxy 104 monitoring the client terminal to which it is assigned 226.

In one feature, once the paging message has been received, the local paging proxy may then ascertain whether the paging message is intended for a client terminal in its local proxy list 228. The local paging proxy 104 may forward the paging message to the specified client terminal 106 via its low power interface 230 if the paging message is intended for a client terminal 106 for which it is acting as a proxy. The client terminal 106 may determine whether the received message is a paging message 232. Note that the received paging message may include sufficient information to allow the client terminal 106 to respond directly to the paging message. If the client terminal 106 determines that a paging message has been received on its low power interface, the client terminal 106 may turn On its high power interface 234 and respond directly to the access point 110 sending the paging message. An acknowledgement 236 of the paging message may be sent from the client terminal 106 to the access point 110 via its high power interface to establish direct communications.

In an example of W-CDMA systems, once the acknowledgement 236 has been received by the access point 110, a radio resource connection (RRC) connection may be setup 238. Optionally, a secure communication link may be setup so that the client terminal 106 may communicate with the access point 110 over a secure connection 240. Finally, communications (e.g., voice or data traffic) between the high power interface of the client terminal 106 and the access point 110 may be established 242. The process of instructing the partitioned proxy server to act as a proxy for one or more client terminals 106 may be repeated multiple times.

Figure 3:
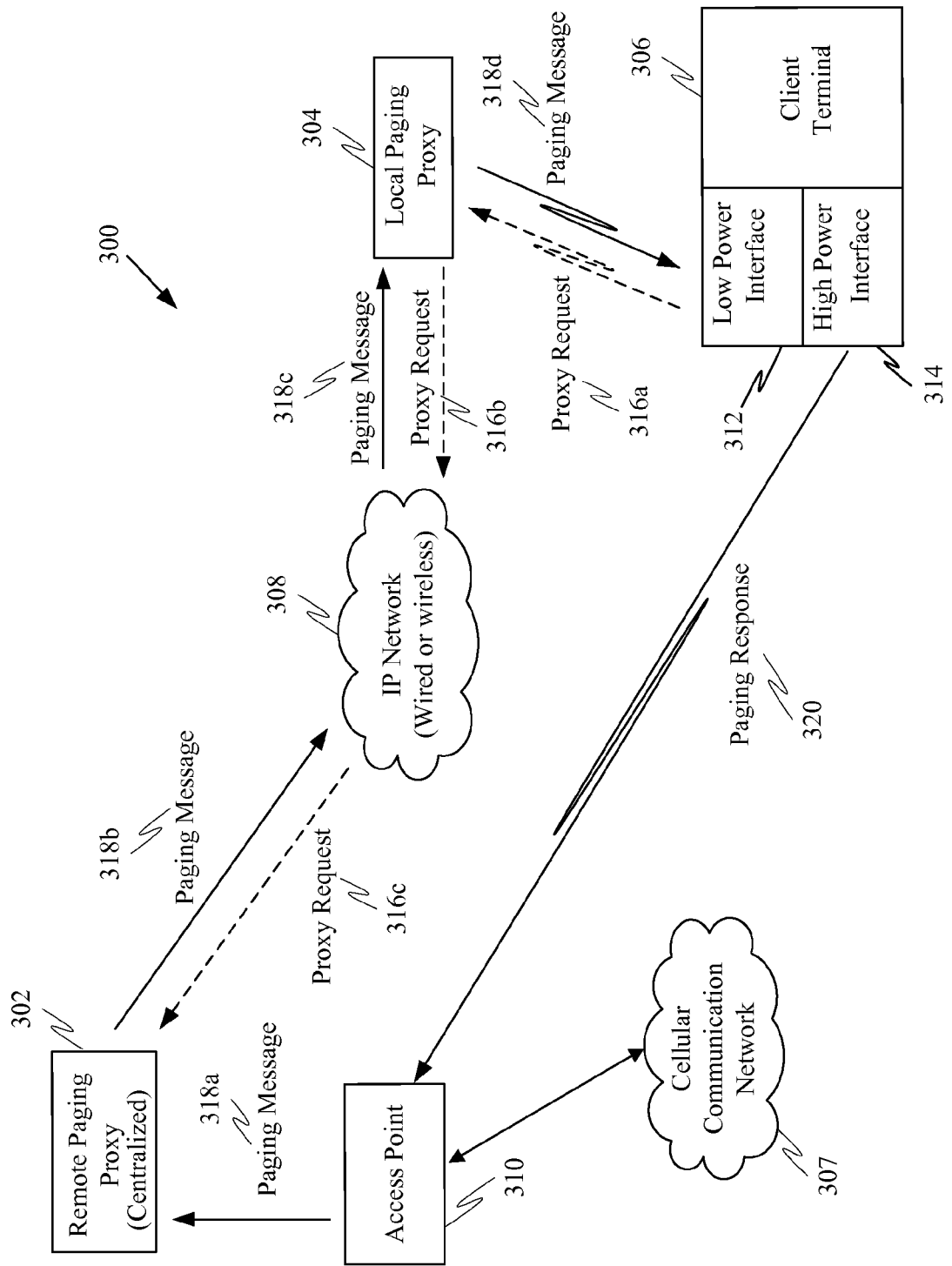
FIG. 3 is a block diagram illustrating another example of a wireless communication system in which a partitioned proxy server facilitates power conservation in client terminals.

FIG. 3 is a block diagram illustrating another example of a wireless communication system 300 in which a partitioned proxy server may act as proxy to facilitate power conservation in client terminals. This example illustrates how the remote paging proxy 302 may be centralized. That is, the functionality of the remote paging proxy may be separate from the access point 310. The remote paging proxy 302 monitors for the paging messages and, if such paging messages are received, it forwards the paging messages to the local paging proxy 304. In this example, the remote paging proxy 302 may communicate with the local paging proxy via a (wired or wireless) IP network 308. Note that a cellular communication network 307 may provide service to the client terminal 306 via one or more access points 310. In some implementations, the cellular communication network 307 may be implemented within the IP network 308. Additionally, in some implementations, the remote paging proxy 302 may be coupled to the cellular communication network 307 so that it can monitor and/or receive paging messages.

The client terminal 306 may send a proxy request (e.g., via its low power interface) to a local paging proxy 304 which adds the client terminal 306 to its local proxy list. The local paging proxy 304 may forward the proxy request 316 to the remote paging proxy 302 via the IP Network 308. The centralized remote paging proxy 302 may add the client terminal 306 to its remote proxy list. When operating as a proxy, the remote paging proxy 302 monitors for paging messages from the access points 310 for the client terminals 306 and forwards a paging message (if received) directly to its corresponding local paging proxy 302 via the IP Network 308.

Once the local paging proxy 304 receives a paging message 318 from the remote local proxy 302, the local paging proxy may ascertain if it is acting as a proxy for the client terminal intended for the message. The local paging proxy 304 may then forward the paging message 318 (or portion thereof) to the client terminal 306 over its low power interface 312. The client terminal 306 may then power up its high-power communication interface 314 and directly respond 320 to the access point 310 that initiated the paging message 318.

Figure 4:
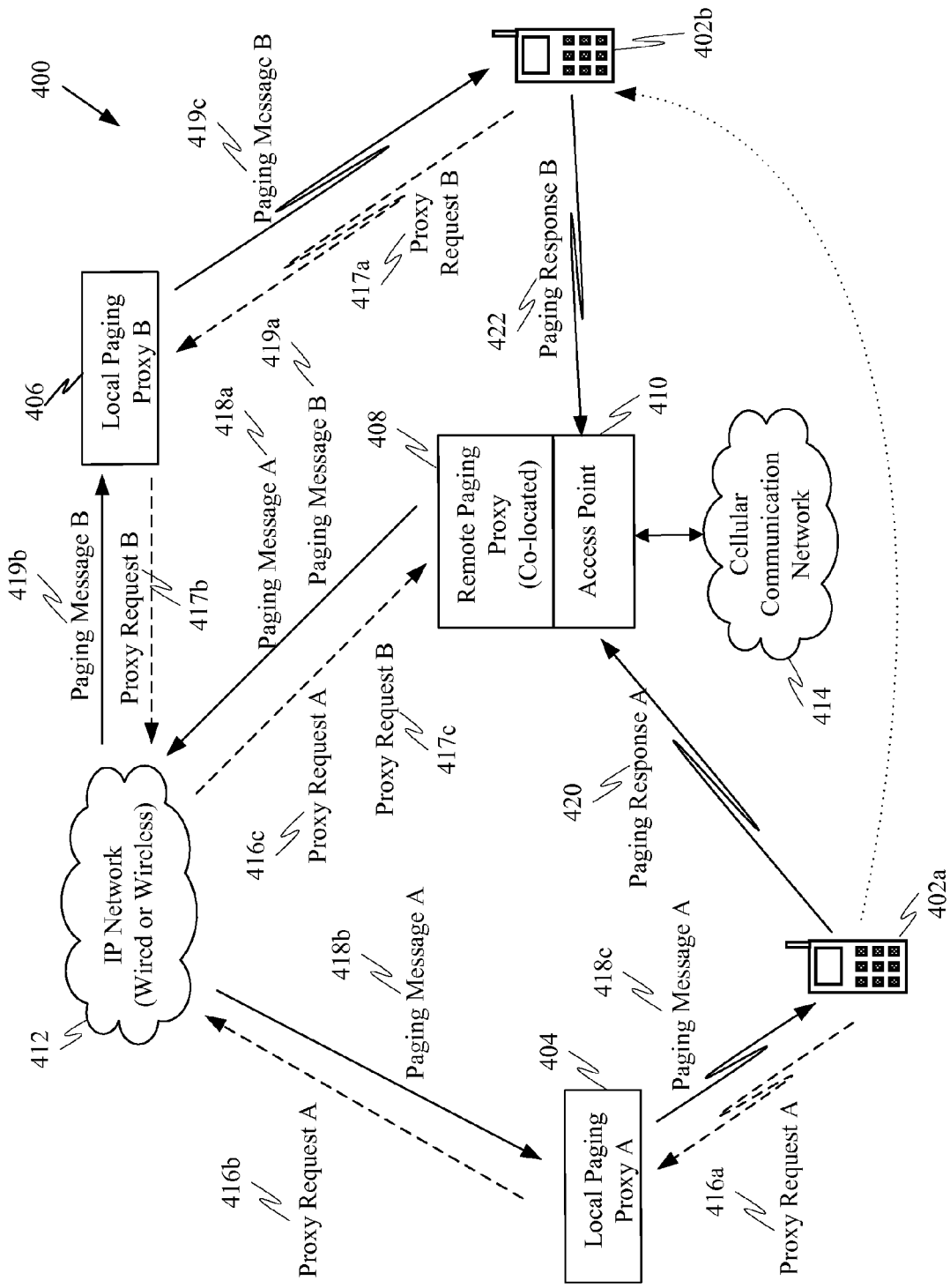
FIG. 4 is a block diagram illustrating an example of a wireless communication system in which one or more partitioned proxy servers may act as proxies to facilitate power conservation in roaming client terminals.

FIG. 4 is a block diagram illustrating an example of a wireless communication system 400 in which one or more partitioned proxy servers may act as proxies to facilitate power conservation in roaming client terminals. That is, a client terminal 402 may roam or move through different cells (e.g., different radio coverage areas) that may be served by the different local paging proxies 404 and 406.

Initially, a client terminal 402a in a first coverage area may request a local paging proxy 404 to act as its proxy for monitoring and forwarding its paging messages. In identifying local paging proxies, the client terminal 402a may attempt to identify potential local paging proxies that have both a network communication interface (to an IP network 412) and a low power interface. When one or more local paging proxies are identified by the client terminal 402a, it may select one local paging proxy 404 to serve as its "proxy" based on which available local paging proxy has the best or strongest short range link as measured or perceived at the client terminal's low power interface. In this example, as local paging proxy A 404 is closer to the client terminal 402 than local paging proxy B 406, the client terminal 402 may select local paging proxy A 404 to act as its proxy. The client terminal 402a may send a proxy request A 416 to the selected local paging proxy A 404. Such proxy request may include sufficient information to identify the client terminal and paging channels (e.g., a Client ID, hop sequence, paging channel(s), sector, etc.).

Once the local paging proxy A 404 has been identified and selected, a communication link via the low power interfaces of both the client terminal 402a and the local paging proxy A 404 may be established or setup and the local paging proxy A 404 adds the client terminal 402a to its local proxy list. Once added to the local proxy list, the local paging proxy A 404 may then forward the proxy request A 416 to a remote paging proxy 408. The remote paging proxy 408 may then add the client terminal 402a to its remote proxy list. As a result, the high power interface of the client terminal 402a may be powered down (e.g., turned Off) to facilitate power conservation. Note that, in this example, the remote paging proxy 408 is co-located with an access point 410 for a cellular communication network 414 through which the client terminal 402 may normally communicate via its high power interface. The cellular communication network may provide the infrastructure (e.g., access points, wired network, etc.) to operate a wireless subscriber communication service. In various examples, the cellular communication network 414 may be separate from the IP network 412 while in other instances the cellular communication network 414 may operate over the IP network 412.

The remote paging proxy 408 of the selected local paging proxy A 404 may monitor one or more access points 410 (or the cellular communication network 414) for paging messages for the client terminal 402a. Upon receiving a paging message 418, the paging message may be sent or forwarded by the remote paging proxy 408 to the local paging proxy A 404 via the IP Network 412. The local paging proxy A 404 may then forward the paging message 418 (or portion thereof) to the client terminal 402a over its low power interface. Upon receipt of the paging message A 418 via its low-power communication interface, the client terminal 402a may power up its high-power communication interface and directly respond to the access point 410 that initiated the paging message 418.

Client terminal 402a may roam from the first coverage area to a second coverage area which is not covered by local paging proxy A 404. That is, the client terminal 402a may periodically or sporadically monitor the low power interface to determine whether is connection with the local paging proxy A 404 is still alive. If the client terminal 402 moves away from the local paging proxy A 404 it may lose its connection or find a better connection via its low power interface. The lack of service in the second coverage area may trigger the re-located client terminal 402b to send a proxy request B to local paging proxy B 406 to act as its proxy. In requesting local paging proxy B act as its proxy, the client terminal 402b may send the proxy request B 417 to the selected local paging proxy B 406. Next, a communication link via the low power interfaces of both the client terminal 402b and the local paging proxy B 406 may be established or setup and the client terminal 402b may be added to the local proxy list. The local paging proxy B 412 may also notify the remote paging proxy 408 that it is the new local paging proxy for the client terminal 402b.

Upon being notified by the new local paging proxy B that it is acting as the proxy for client terminal 402b, the remote paging terminal 408 may forward a future paging message B 419 (intended for the client terminal 402) to the local paging proxy B 460. The local paging proxy B 406 may then forward the paging message B (or portion thereof) to the client terminal 402b over its low power interface. Upon receipt of the paging message B via its low-power communication interface, the client terminal 402b may power up its high-power communication interface and directly respond to the access point 410 that initiated the paging message B 419. In some implementations, rather than actually forwarding a paging message, the remote paging proxy 408 may instruct the access point 410 (or the cellular communication network 414) to forward the paging message to a local paging proxy via the IP network 412.

In some cases, the client terminal 402 may roam into a region without cellular communication network 414 service (i.e., it cannot communicate with an access point 410). However, the client terminal 402 may still be reachable via the IP network 412. Therefore, the remote paging proxy 408 and last known local paging proxy may still forward incoming paging messages to the client terminal (via the IP network 412).

In other cases, the client terminal 402 may roam into a region without cellular communication network 414 service (i.e., it cannot communicate with an access point 410) and/or out of reach of a local paging proxy. In such cases, the remote paging proxy 408 or the last known local paging proxy may store or queue an incoming paging message until it can be delivered to the client terminal. When the client terminal is again within reach of a local paging proxy, the stored/queued paging message may be sent to it.

Figure 5:
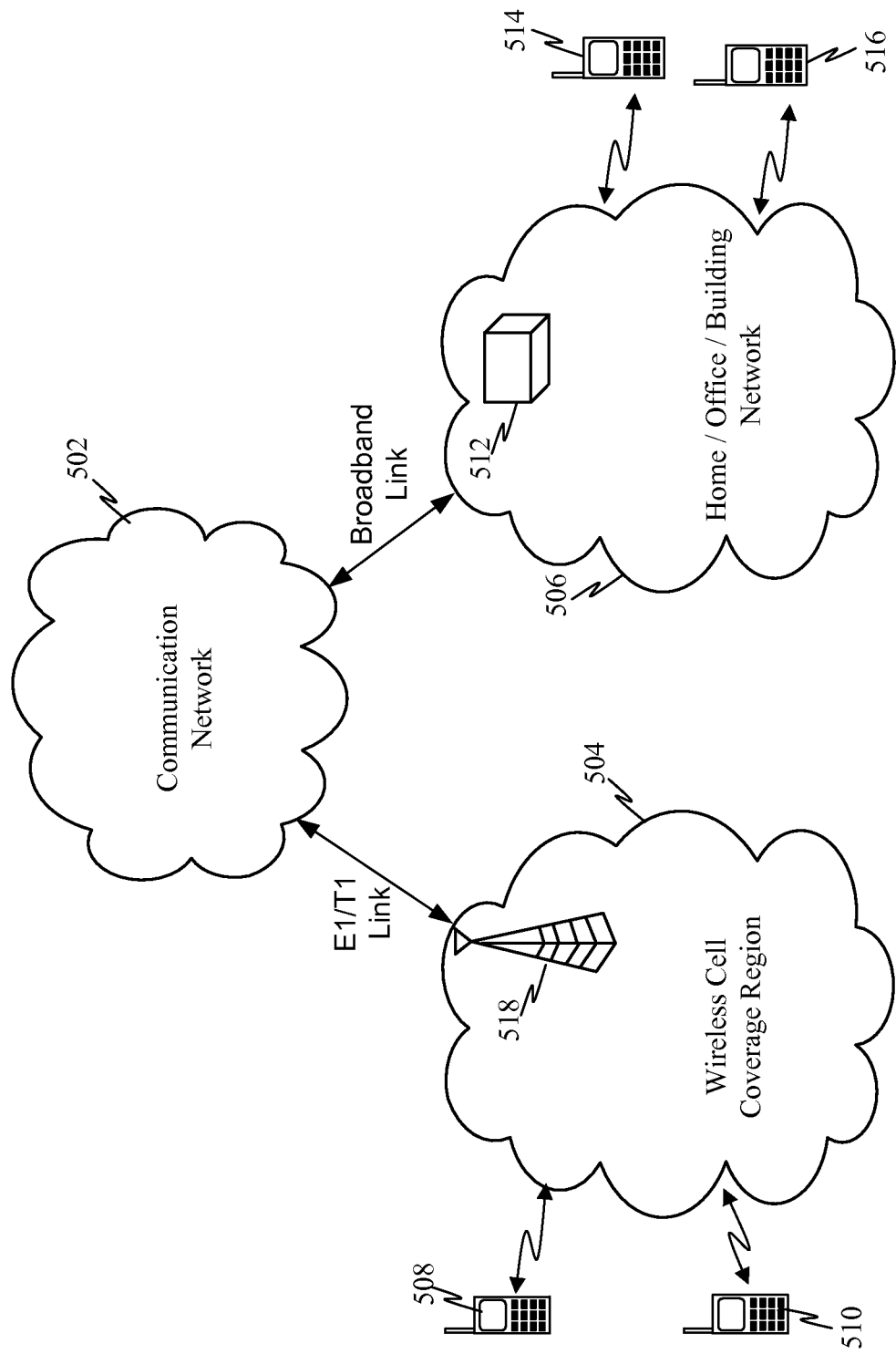
FIG. 5 is a block diagram illustrating yet other examples of wireless communication systems in which one or more proxies may facilitate power conservation in client terminals.

FIG. 5 is a block diagram illustrating yet other examples of wireless communication systems in which one or more proxies may facilitate power conservation in client terminals. This example illustrates how different networks 502, 504, and 506 may be interconnected by high bandwidth links (e.g., broadband, E1/T1, etc) so communications may be carried out between them. Within each network, power conservation of client devices may be implemented by use of the proxy scheme described herein. For instance, in a wireless cell coverage region 504 for a mobile phone network, a plurality of mobile phones (or other communication device) may be served. In this example, a first mobile phone 508 and a second mobile phone 510 may be equipped with a high power interface (e.g., long range, high bandwidth) and a low power interface (e.g., short range, low bandwidth). The first mobile phone 508 may request that a second mobile phone 510 act as its local paging proxy for receiving and forwarding paging messages, thereby allowing the first mobile phone to conserve power by shutting Off (or limiting the "awake" time) of its high power interface. In this example, the second mobile phone 510 may operate as a local paging proxy to receive paging messages from a remote paging proxy. The paging messages may be forwarded by the remote paging proxy to the second mobile phone 510 via the communication network 502 (which may include an IP network and/or cellular communication network). In this example, the remote paging proxy may be located with the serving access point 518 or elsewhere on the communication network.

In another example, a home, office, or building wireless network 502 may be served by a femto/pico cell 512. The femto/pico cell 512 may provide wireless service to a plurality of mobile phones 514 and 516 (or other communication device) within a localized, limited area (e.g., within a home, office, or building). In this example, the femto/pico cell 512 may have both a high power interface, which is normally used to communicate with high power interfaces of the mobile phones 514 and 516 being served, and a low power interface (e.g., short range, low bandwidth, or secondary interface) through which it can communicate with corresponding low power interfaces of the mobile phones 514 and 516. Thus, when a mobile phone designates the femto/pico cell 512 as its local paging proxy (and shuts off the mobile phone's high power interface), the femto/pico cell 512 is able to forward paging messages over their low power interfaces. The paging messages may be forwarded by the remote paging proxy to the femto/pico cell 512 via the communication network 502 (which may include an IP network and/or cellular communication network).

Remote Paging Proxy

Figure 6:
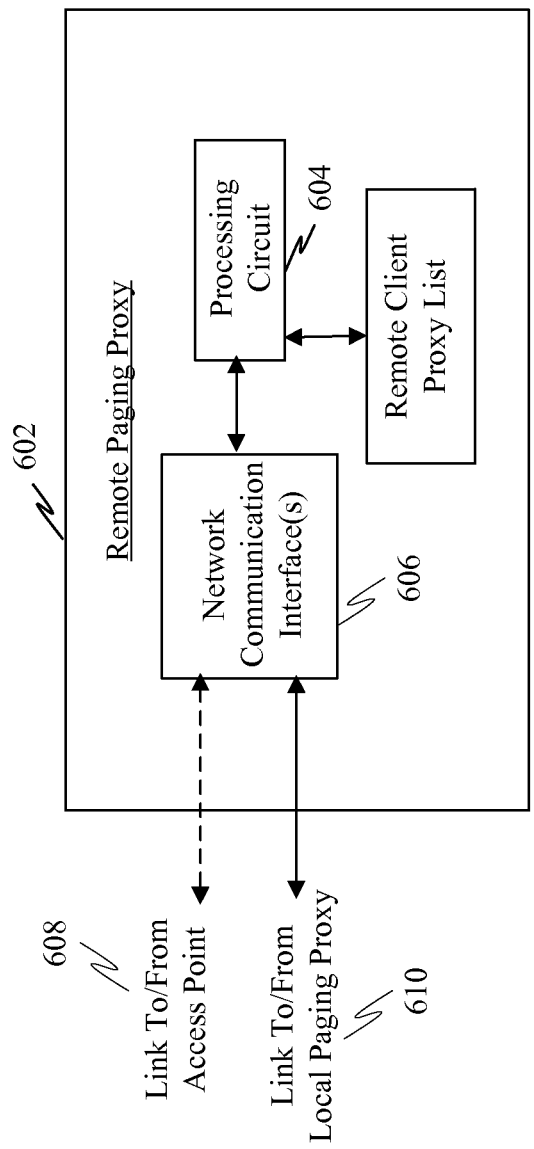
FIG. 6 is a block diagram of an example of a remote paging proxy configured to act as a proxy to facilitate power conservation in client terminals

FIG. 6 is a block diagram of an example of a remote paging proxy of a partitioned proxy server configured to act as a proxy to facilitate power conservation in client terminals. The remote paging proxy 602 may include a processing circuit 604 and one or more network communication interfaces 606. The network communication interfaces 606 may be used for communicating over an IP Network and/or over a cellular communication network. For instance, the remote paging proxy 602 may be communicatively linked to a local paging proxy 610 (e.g., over a first network such as an IP network). Additionally, the remote paging proxy 602 may also be communicatively linked to an access point and/or a cellular network infrastructure 608 (e.g., over a second network such as a cellular communication network).

In one mode of operation, the remote paging proxy 602 may be configured to monitor one or more access points for paging messages for client terminals identified on a client proxy list 614 via its network communication interface. That is, the remote paging proxy 602 may have agreed to act as a proxy for one or more client terminals. In such proxy mode, the remote paging proxy 602 may use its network communication interface to monitor for or receive paging messages intended for the client terminals for which it agreed to act as a proxy. If a paging message is received for a client terminal in which it is acting as a proxy, the remote paging proxy 602 may forward all or part of that paging message through its network communication interface 608 to the local paging proxy 610 which then forwards the message to the appropriate client terminal.

Figure 7:
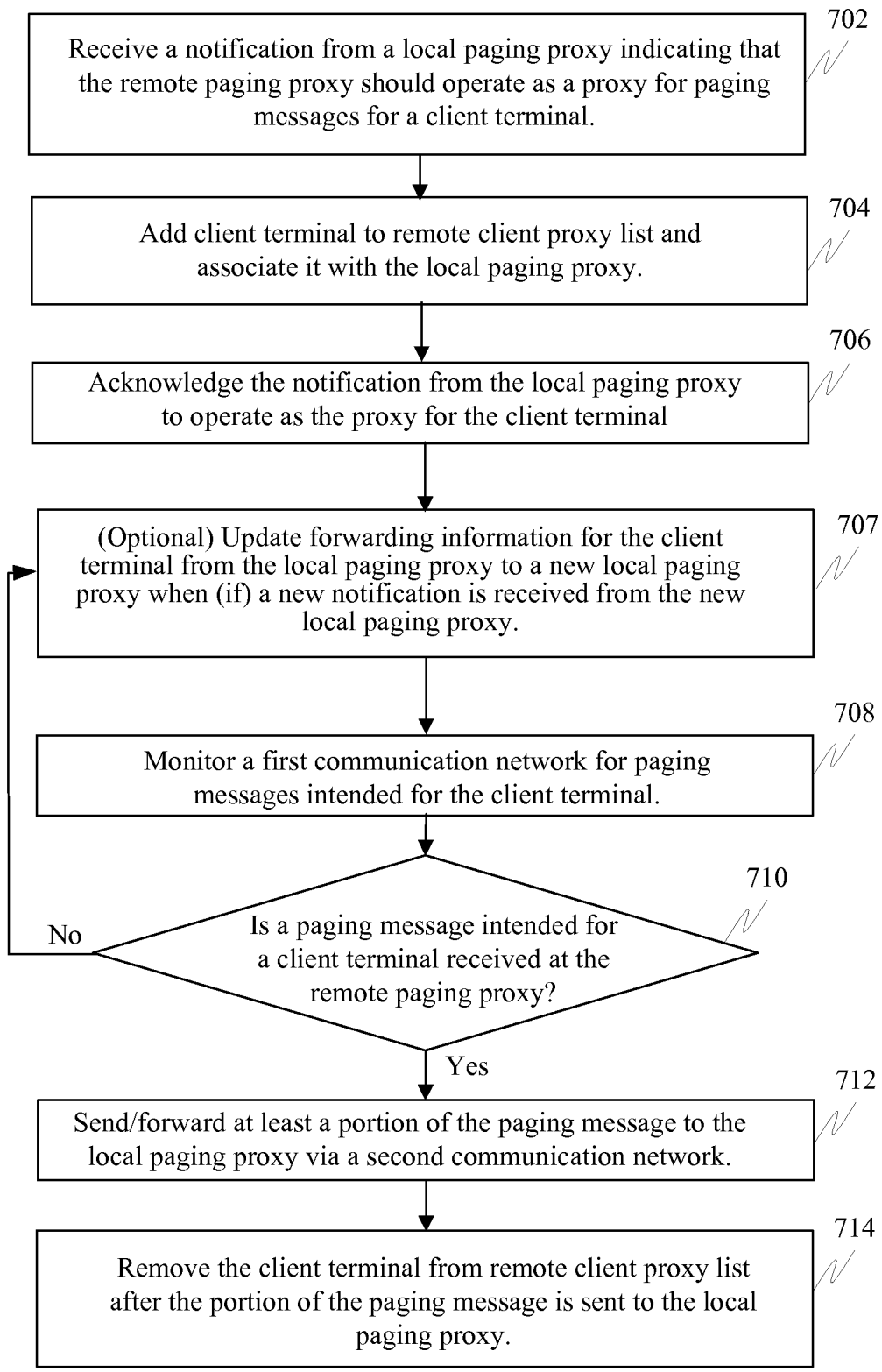
FIG. 7 is a flow diagram illustrating a method operational in a remote paging proxy for facilitating power conservation in client terminals.

FIG. 7 is a flow diagram illustrating a method operational in a remote paging proxy for facilitating power conservation in client terminals. A proxy request notification may be received from a local paging proxy indicating that the remote paging proxy may operate as a proxy for the client terminal 702. The proxy request notification may include a client terminal identifier associated with the client terminal, and other information (e.g., hop sequence, traffic/paging channel, sector, etc.) sufficient to allow the remote paging proxy to monitor for paging messages for the client terminal. Such notification may be received via a second communication network (e.g., an IP Network) that may be distinct from a first communication network (e.g., cellular network) through which the client terminal normally communicates. The client terminal may then be added to a remote proxy list on the remote paging proxy and is also associated with the local paging proxy 704. This allows the remote paging proxy to subsequently forward a received paging message to the right local paging proxy. Additionally, the remote paging proxy may acknowledge the notification from the local paging proxy to operate as the proxy for the client terminal 706. Such acknowledgment may be passed onto the client terminal so that it can shut Off its high-power (or primary) interface knowing that its paging messages will be monitored.

The remote paging proxy may then monitor the first communication network for paging messages intended for the client terminal 708. For instance, the remote proxy terminal may receive paging message directly from an access point or from another device on the first communication network. Alternatively, the remote proxy terminal monitors for (over-the-air) broadcasts from the access point (or first communication network) to obtain the paging message.

The remote paging proxy may determine whether a received paging message is intended for a client terminal on the remote proxy list 710. If no paging messages for the client terminal in the remote proxy list are received, the remote paging proxy may continue to monitor the first communication network for paging messages 708 for the client terminal via its network communication interface. If the remote paging proxy receives a paging message that is meant for the client terminal on the remote proxy list, the remote paging proxy sends or forwards at least a portion of an obtained paging message content to the local paging proxy via a second communication network (e.g., IP network) 712. The portion of the paging message may be sufficient to allow the receiving client terminal to respond to the paging message directly to an access point of the first communication network. The forwarded paging message may include, but is not limited to the sector, the traffic or frequency channel along with any other information used by the client terminal to establish communications with the access point.

Once the paging message has been forwarded to the local paging proxy (for forwarding to the client terminal over a low-power interface), the client terminal may be removed from the remote client proxy list 714 of the remote paging proxy. Optionally, the remote paging proxy may update forwarding information for the client terminal from the local paging proxy to a new local paging proxy when a new notification is received from the new local paging proxy 707.

Local Paging Proxy

Figure 8:
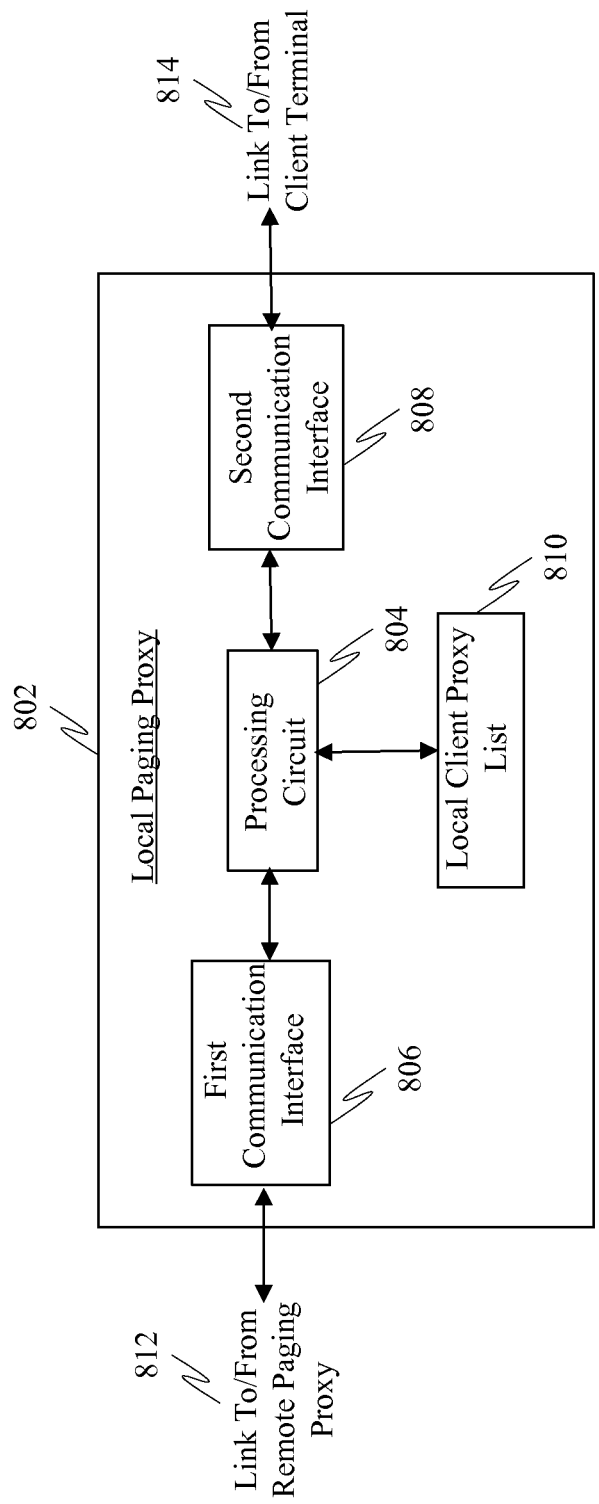
FIG. 8 is a block diagram of an example of a local paging proxy configured to act as a proxy to facilitate power conservation in client terminals that it serves.

FIG. 8 is a block diagram of an example of a local paging proxy configured to act as a proxy to facilitate power conservation in client terminals that it serves. The local paging proxy 802 may include a first communication interface 806 to communicate with a remote paging proxy 812 (e.g., via an IP network). The local paging proxy 802 may also include a second communication interface 808 to communicate with one or more client terminals (e.g., mobile phones, etc.). The second communication interface 808 may be a wireless low power communication interface. A processing circuit 804 may be configured to control transmissions and/or reception over the first and second communication interfaces 806 and 808. For instance, the local paging proxy 802 may have received a proxy request notification from one or more client terminals. As a result, the local paging proxy 802 adds the one or more requesting client terminals to a local proxy list 810. The local paging proxy 802 also sends the proxy requests notifications onto the remote paging proxy 812.

If the local paging proxy 802 receives a paging message via the first communication interface 806, it checks whether it is intended for a client terminal in its local proxy list 810. If so, the local paging proxy 802 sends the paging message (or portion thereof) via its second communication interface 808 (e.g., low-power communication interface) to the intended client terminal so that the client terminal may respond directly to the paging message. Otherwise, the access point 802 discards the paging message.

The local paging proxy may monitor for the presence of the client terminal via the second communication interface 808. If it is determined that the client terminal is no longer reachable by the local paging proxy 802 via the second communication interface 808, the local paging proxy 802 may cease operating as a proxy for the client terminal.

According to another feature, the proxy request may be triggered by the client terminal moving out of a service area. Consequently, the local paging proxy 802 may store the portion of the received paging message for later delivery to the client terminal when it is determined that the client terminal has moved out of a service area.

According to yet another feature, the client terminal may find itself in an Out of Service (OOS) area. In such cases, the client terminal may operate in (or goes into) a proxied (or sleep) mode, i.e. the client terminal may be turned off or out of service and no longer in communication with a cellular network. Consequently, the client terminal does not try to acquire the cellular network but instead waits until it receives a notification or message from the local paging proxy.

When the client terminal is in this proxied mode, the local paging proxy may continue to monitor for paging messages from the remote paging proxy. Upon detecting a paging message for the client terminal, the local paging proxy may then notify the client terminal of an incoming paging message. When the client terminal is notified by the local paging proxy of the incoming paging message, the client terminal may then turn On and re-acquire or re-establish communication with the cellular network. If the client is unable to successfully re-acquire or re-establish communication with the cellular network in time, the client terminal may be subsequently notified of a missed paging message. By only turning On when it receives a notification from the local paging proxy of an incoming (or missed) paging message, the client terminal may conserve power as it does not have to periodically turn On to check for messages According to one example, the local paging proxy 802 and remote paging proxy may communicate over a first communication network (e.g., via first communication interface 806) and the paging message is a request to initiate a communication session with the client terminal via a second communication network (e.g., via a wireless communication link).

Figure 9:
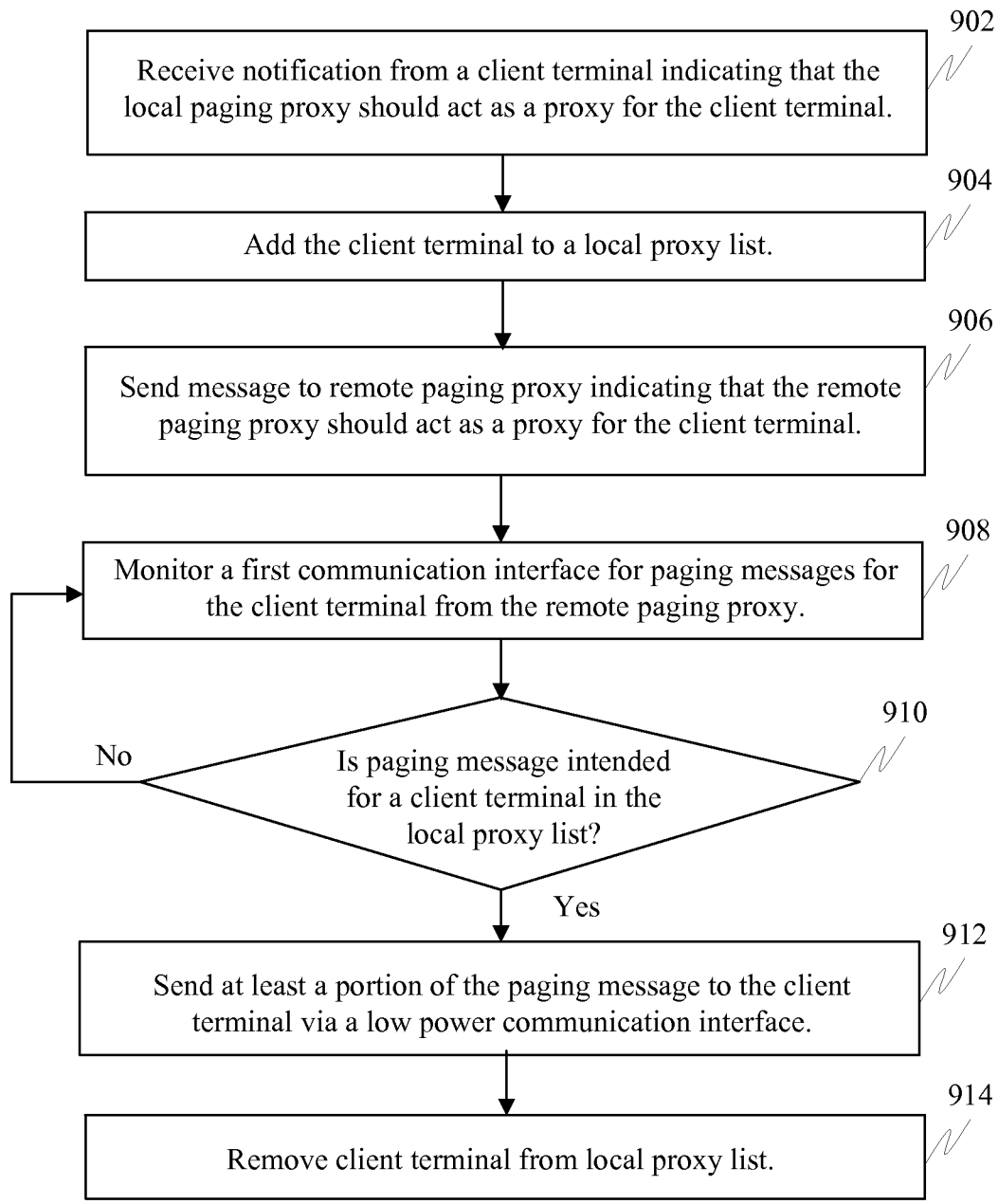
FIG. 9 is a flow diagram illustrating a method operational in a local paging proxy for facilitating power conservation in client terminals which it serves.

FIG. 9 is a flow diagram illustrating a method operational in a local paging proxy for facilitating power conservation in client terminals which it serves. A proxy request notification may be received from a client terminal indicating that the local paging proxy should operate as a proxy for the client terminal 902. Such notification may be received on a second communication interface (low-power interface) of the local paging proxy. The local paging proxy may add the client terminal to a local proxy list 904. The local paging proxy may send a message to a remote paging proxy indicating that the remote paging proxy should act as a proxy for the client terminal 906.

The local paging proxy may monitor a first communication interface for paging messages over the first communication interface 908. Such network communication interface may couple the local paging proxy to an extended network infrastructure. The local paging proxy may (optionally) determine whether a received paging message is intended for a client terminal on the local proxy list 910. If the intended client terminal is not in the client proxy list, the local paging proxy continues to monitor for paging messages from the remote paging proxy 908. Otherwise, if the intended client terminal is in the local proxy list, the local paging proxy sends at least a portion of the paging message to the client terminal via a second communication interface 912 (e.g., low power interface). The portion of the sent paging message is sufficient to allow the receiving client terminal to respond to the paging message directly to the sending access point. Once the paging message has been forwarded to the corresponding client terminal, the client terminal may be removed from the local proxy list 914 of the local paging proxy. In one implementation, the local paging proxy and remote paging proxy may communicate over a first communication network while the paging message is a request to initiate a communication session with the client terminal via a second communication network.

Client Terminal

Figure 10:
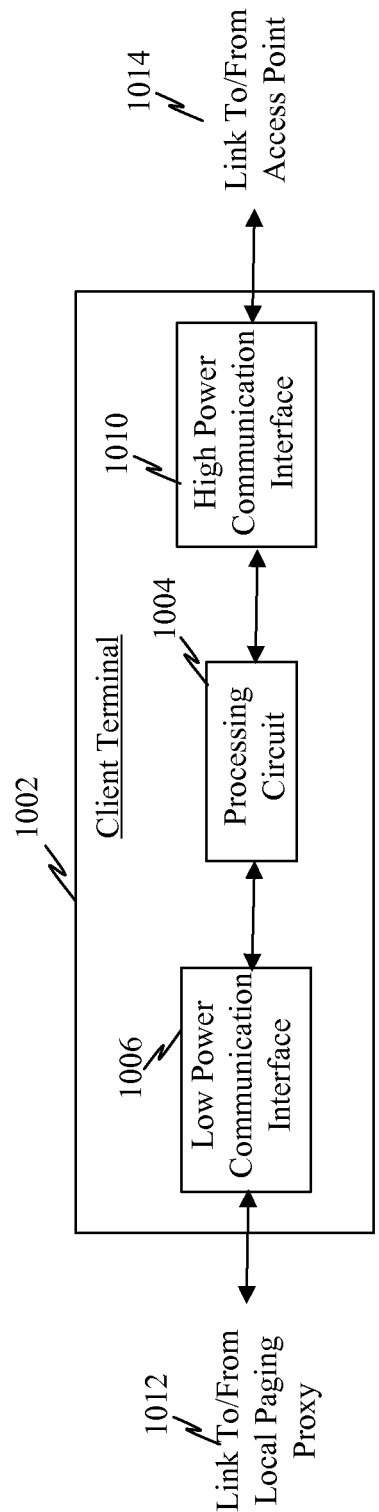
FIG. 10 is a block diagram of an example of a client terminal configured for power conservation by using a partitioned proxy server.

FIG. 10 is a block diagram of an example of a client terminal configured for power conservation by using a partitioned proxy server. The client terminal 1002 may include a processing circuit 1004, such as a small and/or low-power microprocessor. The client terminal 1002 may also include a low power communication interface 1006 used to couple the client terminal 1002 to devices on a first wireless network, such as linking to local paging proxies 1012. For example, the low power communication interface 1006 may be used for short range communications, such as over a Bluetooth-compliant network. A high power communication interface 1010 may be used to allow the client terminal 1002 to communicate with devices on a second wireless network, such as linking to network access points 1014. For example, the high power communication interface 1010 may be used for long range communications, such as over a CDMA-compliant network. The client terminal 1002 may be battery-powered and the amount of power such battery can provide is limited.

In prior art approaches, the high power communication interface of the client terminal is powered On to listen for paging messages, at least during certain time intervals, draining the power from an internal power source (e.g., battery) of the client terminal. For instance, a paging channel may be divided into numbered frames. The client terminal may be assigned specific frames on which it may receive terminal-specific messages. With such a paging channel, the client terminal can enter discontinuous reception (DRX) operation whereby it periodically, rather than continuously, monitors the paging channel for messages using its high power interface. While in DRX operation, the client terminal wakes up from a "sleep" state prior to its assigned frame, enters an "awake" state and processes or monitors the paging channel for messages, and reverts back to the sleep state if additional communication is not required. Although such prior art client terminal is not continuously powered up for monitoring for paging messages, it is still powered up at pre-determined intervals which drain the internal battery of the client device.

By contrast, the client terminal 1002 may be configured to achieve improved power savings by using a partitioned proxy server including a remote paging proxy and a local paging proxy. The client terminal 1002 requests that a local paging proxy 1012 act as its proxy to monitor for its paging messages. The client terminal 1002 then turns off its high-power communication interface 1010 to conserve power. The client terminal may then monitors its low power communication interface 1006 to determine if the local paging proxy has forwarded at least a portion of a paging message intended for the client terminal 1002. If the at least a portion of a paging message is received on the low power communication interface 1006, the client terminal 1002 may then respond via its high power communication interface 1010 to the access point 1014 that initiated or sent the paging message.

Figure 11:
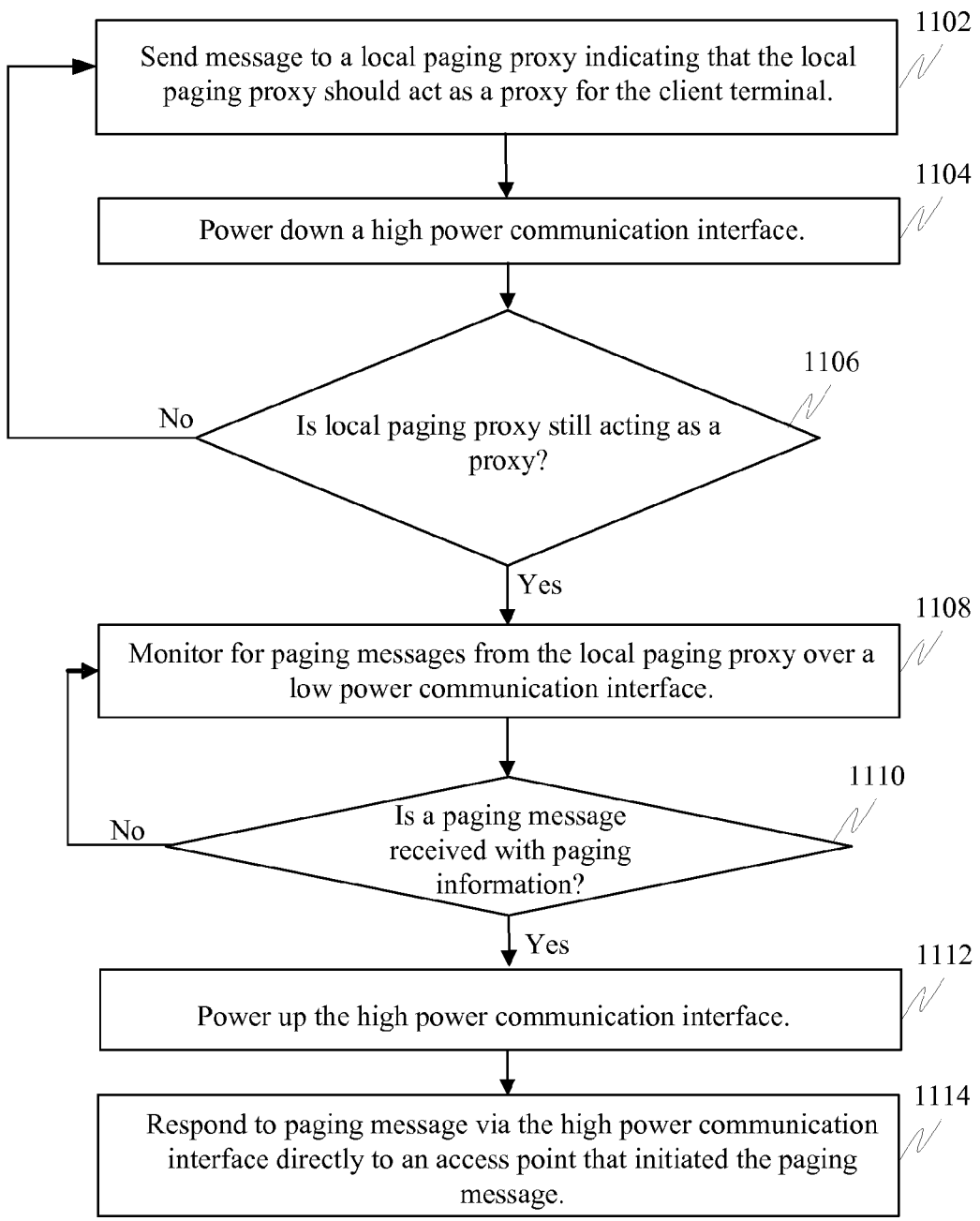
FIG. 11 is a flow diagram illustrating a method operational in a client terminal for power conservation by using a partitioned proxy server.

FIG. 11 is a flow diagram illustrating a method operational in a client terminal for power conservation by using a partitioned proxy server. Initially, a message may be sent to a local paging proxy indicating that the local paging proxy should act as a proxy for the client terminal 1102. The client terminal may then power down its high power communication interface 1104. The client terminal may periodically verify that the local paging proxy is still acting as its proxy 1106. If the local paging proxy is no longer acting as its proxy, it may seek a new local paging proxy as indicated above with reference to step 1102. Alternatively, if the local paging proxy is still acting as a proxy for the client terminal, the client terminal may then listen for paging messages from the local paging proxy over a low power communication interface 1108. The client terminal may determine whether a paging message is received with the paging information 1110. If not, the client terminal may continue to listen for paging messages from the local paging proxy over its low power communication interface. Otherwise, the client terminal may power up its high power communication interface 1112. Once the high power communication interface has been powered up, the client terminal may use it to respond directly to the access point that initiated the paging message 1114.

Co-Located Access Point and Remote Paging Proxy

Figure 12:
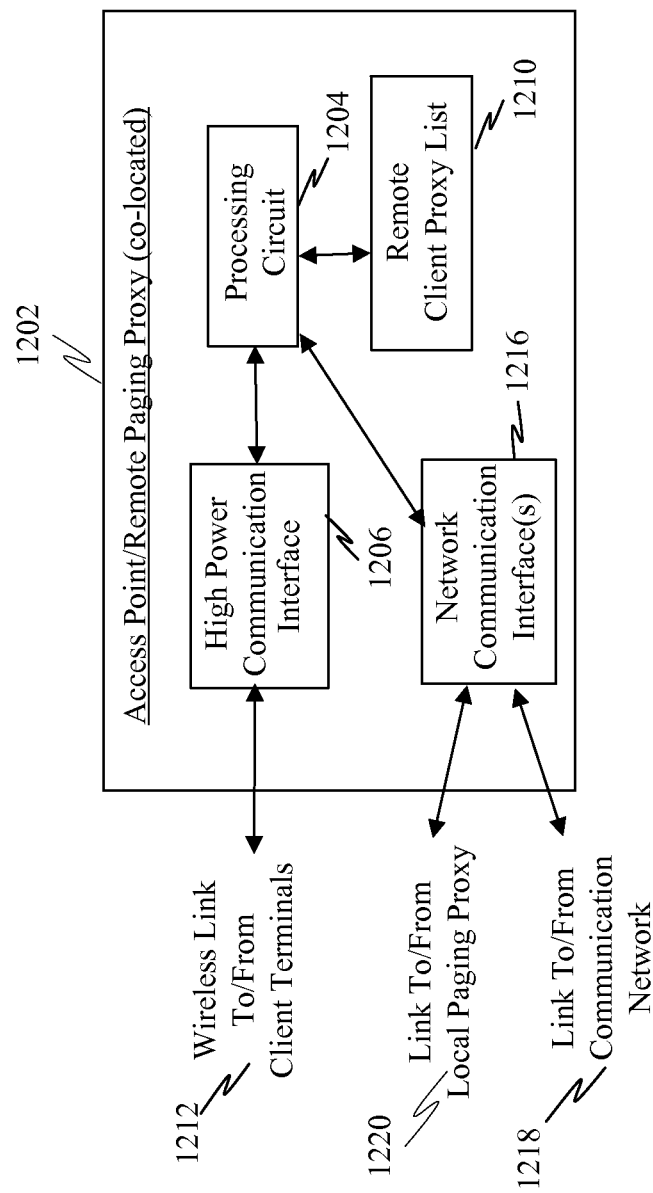
FIG. 12 is a block diagram of an example of an access point co-located with a remote paging proxy configured to act as a proxy to facilitate power conservation in client terminals that it serves.

FIG. 12 is a block diagram of an example of an access point co-located with a remote paging proxy configured to act as a proxy to facilitate power conservation in client terminals that it serves. The access point/remote paging proxy 1202 may be, for example, a femto cell, pico cell, base station, or other network device that links to a communication network 1218 via a network communication interface 1216 to facilitate communications to and/or from client terminals which it serves. The access point/remote paging proxy 1202 may also include a processing circuit 1204 and a high power communication interface 1206 (e.g., a long range transceiver, such as over a CDMA-compliant transceiver) to communicate with client terminals (e.g., mobile phones, etc.) being served by the access point/remote paging proxy 1202.

If the access point/remote paging proxy 1202 receives a paging message via the network communication interface 1216, it checks whether it is intended for a client terminal in its remote proxy list 1210. If so, the access point/remote paging proxy 1202 sends the paging message (or portion thereof) via its network communication interface 1216 to the local paging proxy 1220 for forwarding to the intended client terminal. Otherwise, the access point/remote paging proxy 1202 sends the paging message via its high power communication interface 1212 to the intended client terminal. In response to such paging message, the access point/remote paging proxy 1202 may receive a response via its high power communication interface 1212 from the intended recipient client terminal.

Figure 13:
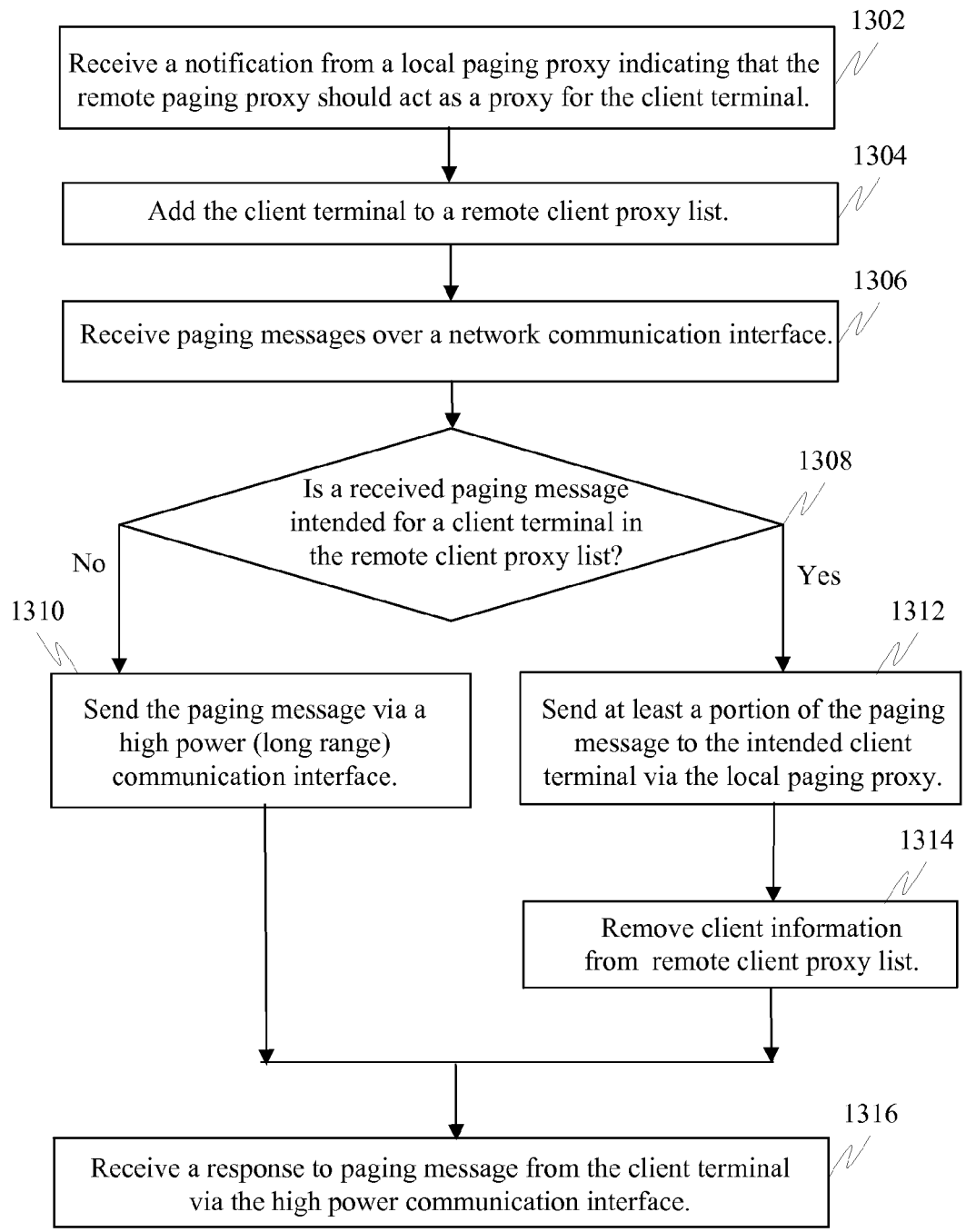
FIG. 13 is a flow diagram illustrating a method operational in an access point/remote paging proxy for facilitating power conservation in client terminals which it serves.

FIG. 13 is a flow diagram illustrating a method operational in an access point/remote paging proxy for facilitating power conservation in client terminals which it serves. A notification may be received from a local paging proxy indicating that the access point/remote paging proxy should operate as a proxy for the client terminal 1302. Such notification may be received on the network communication interface from the local paging proxy. The access point/remote paging proxy may add the client terminal to a remote client proxy list 1304. The access point/remote paging proxy may receive paging messages over a network communication interface 1306. Such network communication interface may couple the access point/remote paging proxy to an extended network infrastructure. The access point/remote paging proxy may determine whether a received paging message is intended for a client terminal on the remote client proxy list 1308. If the intended client terminal is not in the remote client proxy list, the paging message is sent via a high power (long range) communication interface 1310. Otherwise, if the intended client terminal is in the remote client proxy list, the access point/remote paging proxy sends at least a portion of the paging message content to the intended client terminal via the local paging proxy 1312. The portion of the paging message is sufficient to allow the receiving client terminal to respond to the paging message directly to the sending access point. Once the paging message has been forwarded to the corresponding client terminal, via the local paging proxy, the client terminal may be removed from the remote client proxy list 1314 of the access point/remote paging proxy. The access point/remote paging proxy may receive a response to the paging message from the client terminal via the high power communication interface 1316.

By powering down the high power communication interface of the client terminal and using a partitioned proxy server, having a remote paging proxy and a local paging proxy, to monitor for paging messages for the client terminal, power is conserved. Consuming less power allows a client terminal to operate longer on a given battery charge, and therefore extend the standby time of the client terminal. Since client terminals are typically used in mobile telecommunications, it is often necessary to go extended periods of time without recharging or replacing the battery of the client terminal. Thus, in order to provide increased convenience, and to reduce the likelihood of missing paging messages due to battery depletion, extending the standby time for a given battery size is highly desirable.

In the prior art approaches, the client terminal spends most of the time in the idle mode which, as described previously. For example, in the case of W-CDMA, the idle time may be as much as 99%. However, even in idle mode, the client terminal is nevertheless consuming power as it cycles its high power communication interface On and Off to listen for paging messages on its associated paging channels. Consequently, as discussed above, for a CDMA (including W-CDMA) compliant prior art client terminal, current consumption in idle mode may be in the range of 2.5 to 3 mA.

However, by shutting Off the high power communication interface of a client terminal for longer periods of time and relying on paging notifications from a local paging proxy via a low power communication interface, power consumption may be significantly reduced. For instance, the low power communication interface (e.g., Bluetooth interface in Page Scan mode) may be as low as 0.3 mA and may be reduced further if a sniff mode is used. For example, current consumption may be reduced to 0.03 mA with a 1.3 second sniff cycle using the low power communication interface. By reducing idle power consumption and/or completely turning off the high power communication interface of the client terminal, the life of the internal battery or power source may be extended.

One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, and/or functions illustrated in FIGS. 1, 2, 3, 4, 5, 6, 7, 8, 9, 10, 11, 12 and/or 13 may be rearranged and/or combined into a single component, step, or function or embodied in several components, steps, or functions. Additional elements, components, steps, and/or functions may also be added. The apparatus, devices, and/or components illustrated in FIGS. 1, 3, 4, 5, 6, 8, 10 and/or 12 may be configured to perform one or more of the methods, features, or steps described in FIGS. 2, 7, 9, 11 and/or 13. The novel algorithms described herein may be efficiently implemented in software and/or embedded in hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. It should be noted that the foregoing embodiments are merely examples and are not to be construed as limiting. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A local paging proxy device comprising:
a first communication interface for communicating over a first communication network with a remote paging proxy;
a second communication interface for communicating over a second communication network with a client terminal, the first communication network and second communication network distinct from a wireless communication network used by the client terminal to communicate with an access point;
a processing circuit coupled to the first communication interface and the second communication interface, the processing circuit configured to:
receive, via the second communication network, a notification from the client terminal to operate as a proxy for the client terminal;
send, via the first communication network, a message to the remote paging proxy to notify the remote paging proxy to operate as a proxy for paging messages for the client terminal;
monitor the first communication interface for paging messages for the client terminal from the remote paging proxy; and
send at least a portion of a received paging message to the client terminal via the second communication interface.

2. The device of claim 1, wherein the processing circuit is further configured to:
add the client terminal to a local proxy list.

3. The device of claim 2, wherein the processing circuit is further configured to:
remove the client terminal from the local proxy list after the portion of the paging message is sent to the client terminal.

4. The device of claim 1, wherein the first communication interface is a network communication interface and the second communication interface is a wireless communication interface.

5. The device of claim 1, wherein the received notification from the client terminal includes a client identifier associated with the client terminal.

6. The device of claim 1, wherein the portion of the paging message sent by the remote paging proxy is sufficient for the client terminal to respond to the paging message directly to the access point via the wireless communication network.

7. The device of claim 1, wherein the portion of the paging message includes at least one of a paging channel and a sector.

8. The device of claim 1, wherein the processing circuit is further configured to:
monitor for the presence of the client terminal via the second communication interface; and
cease operating as a proxy for the client terminal if it is determined that the client terminal is no longer reachable by the local paging proxy via the second communication interface.

9. The device of claim 1, wherein the processing circuit is further configured to:
store the portion of the received paging message for later delivery to the client terminal when it is determined that the client terminal has moved out of a service area.

10. The device of claim 1, wherein the notification is a proxy request that is triggered by the client terminal moving out of a service area.

11. The device claim 1, wherein the paging message is a request to initiate a communication session with the client terminal via a second the wireless communication network.

12. The device of claim 1, wherein the client terminal powers up only when notified of a received paging message.

13. The device of claim 1, wherein the first communication network is an internet packet (IP) network and the second communication network is an ad-hoc peer-to-peer network.

14. The device of claim 1, wherein the wireless communication network is a cellular communication network.

15. The device of claim 1, wherein the local paging proxy is a non-client terminal device.

16. The device of claim 1, wherein a response to the paging message from the client terminal bypasses the first communication network.

17. A method operational on a local paging proxy comprising:
 receiving, over a second communication network, a notification from a client terminal to operate as a proxy for paging messages for the client terminal;
 sending, over a first communication network, a message to a remote paging proxy to notify the remote paging proxy to operate as a proxy for the client terminal;
 monitoring a first communication interface for paging messages over the first communication network, for the client terminal from the remote paging proxy, the first communication network and second communication network distinct from a wireless communication network used by the client terminal to communicate with an access point; and
 sending, over the second communication network, at least a portion of a received paging message to the client terminal via a second communication interface.

18. The method of claim 17, further comprising:
 adding the client terminal to a local proxy list; and
 removing the client terminal from the local proxy list after the portion of the paging message is sent to the client terminal via the second communication interface.

19. The method of claim 17, wherein the local paging proxy operates as a proxy for a plurality of client terminals by monitoring for paging messages from the remote paging proxy.

20. The method of claim 17, further comprising:
 monitoring for the continued presence of the client terminal via the second communication interface; and
 ceasing operating as a proxy for the client terminal if it is determined that the client terminal is not longer reachable by the local paging proxy via the second communication interface.

21. The method of claim 17, further comprising:
 storing the portion of the received paging message for later delivery to the client terminal when it is determined that the client terminal has moved out of a service area.

22. The method of claim 17, wherein the paging message is a request to initiate a communication session with the client terminal via the wireless communication network.

23. The method of claim 17, wherein the client terminal powers up only when notified of a received paging message.

24. The method of claim 17, wherein the first communication network is an IP network and the second communication network is an ad-hoc peer-to-peer network.

25. The method of claim 17, wherein the wireless communication network is a cellular communication network.

26. The method of claim 17, wherein the local paging proxy is a non-client terminal device.

27. The method of claim 17, wherein a response to the paging message from the client terminal bypasses the first communication network.

28. A local paging proxy device comprising:
 means for receiving, over a second communication network, a notification from a client terminal to operate as a proxy for paging messages for the client terminal;
 means for sending, over a first communication network, a message to a remote paging proxy to notify the remote paging proxy to operate as a proxy for the client terminal;
 means for monitoring a first communication interface for paging messages over the first communication network, for the client terminal from the remote paging proxy, the first communication network and second communication network distinct from a wireless communication network used by the client terminal to communicate with an access point; and
 means for sending, over the second communication network, at least a portion of a received paging message to the client terminal via a second communication interface.

29. The device of claim 28, wherein the first communication network is an IP network and the second communication network is an ad-hoc peer-to-peer network.

30. The device of claim 28, wherein the wireless communication network is a cellular communication network.

31. The device of claim 28, wherein the local paging proxy is a non-client terminal device.

32. The device of claim 28, wherein a response to the paging message from the client terminal bypasses the first communication network.

33. A non-transitory processor readable medium having one or more instructions operational on a local paging proxy device, which when executed by a processor causes the processor to:
 receive, over a second communication network, a notification from a client terminal to operate as a proxy for paging messages for the client terminal;
 send, over a first communication network, a message to a remote paging proxy to notify the remote paging proxy to operate as a proxy for the client terminal;
 monitor a first communication interface for paging messages over the first communication network, for the client terminal from the remote paging proxy, the first communication network and second communication network distinct from a wireless communication network used by the client terminal to communicate with an access point; and
 send, over the second communication network, at least a portion of a received paging message to the client terminal via a second communication interface.

34. The non-transitory processor readable medium of claim 33, wherein the first communication network is an internet packet (IP) network.

35. The non-transitory processor readable medium of claim 33, wherein the second communication network is an ad-hoc peer-to-peer network.

36. The non-transitory processor readable medium of claim 33, wherein the wireless communication network is a cellular communication network.

37. The non-transitory processor readable medium of claim 33, wherein the local paging proxy is a non-client terminal device.

38. The non-transitory processor readable medium of claim 33, wherein a response to the paging message from the client terminal bypasses the first communication network.

39. The non-transitory processor readable medium of claim 33 further comprising instructions which when executed by the processor causes the processor to:
add the client terminal to a local proxy list.

40. The non-transitory processor readable medium of claim 33, wherein the received notification from the client terminal includes a client identifier associated with the client terminal.

41. The non-transitory processor readable medium of claim 33, wherein the portion of the paging message sent by the remote paging proxy is sufficient for the client terminal to respond to the paging message directly to the access point.

42. The non-transitory processor readable medium of claim 33, wherein the portion of the paging message includes at least one of a paging channel and a sector.

43. The non-transitory processor readable medium of claim 33 further comprising instructions which when executed by the processor causes the processor to:
monitor for the presence of the client terminal via the second communication interface; and
cease operating as a proxy for the client terminal if it is determined that the client terminal is no longer reachable by the local paging proxy via the second communication interface.

44. The non-transitory processor readable medium of claim 33 further comprising instructions which when executed by the processor causes the processor to:
store the portion of the received paging message for later delivery to the client terminal when it is determined that the client terminal has moved out of a service area.

45. The non-transitory processor readable medium claim 33, wherein the paging message is a request to initiate a communication session with the client terminal via the wireless communication network.

\* \* \* \* \*